| (12) | United States Patent | (10) Patent No.: US 12,081,098 B2 |
|---|---|---|
| | Nakamura | (45) Date of Patent: Sep. 3, 2024 |

(54) BRUSHLESS MOTOR AND ELECTRIC TOOL

(71) Applicant: Panasonic Intellectual Property Management Co., Ltd., Osaka (JP)

(72) Inventor: Akito Nakamura, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 87 days.

(21) Appl. No.: 17/908,165

(22) PCT Filed: Jan. 25, 2021

(86) PCT No.: PCT/JP2021/002446
§ 371 (c)(1),
(2) Date: Aug. 30, 2022

(87) PCT Pub. No.: WO2021/176884
PCT Pub. Date: Sep. 10, 2021

(65) Prior Publication Data
US 2023/0111524 A1  Apr. 13, 2023

(30) Foreign Application Priority Data
Mar. 4, 2020  (JP) ................................ 2020-037217

(51) Int. Cl.
*H02K 9/06* (2006.01)
*H02K 3/52* (2006.01)
(Continued)

(52) U.S. Cl.
CPC .......... *H02K 5/1732* (2013.01); *H02K 3/522* (2013.01); *H02K 7/083* (2013.01); *H02K 7/145* (2013.01);
(Continued)

(58) Field of Classification Search
CPC ...... H02K 5/1732; H02K 3/522; H02K 7/083; H02K 7/145; H02K 9/06; H02K 21/16; H02K 2203/12
(Continued)

(56) References Cited

U.S. PATENT DOCUMENTS 2,462,204 A    3/1947  Ludwig
5,068,556 A   11/1991  Lykes et al.
(Continued)

FOREIGN PATENT DOCUMENTS

DE    10152149    *  5/2003  .............. H02K 5/15
EP     1313199 A2    5/2003
(Continued)

OTHER PUBLICATIONS

Extended European Search Report dated Jul. 19, 2023 issued in the corresponding European Patent Application No. 21765300.5.
(Continued)

*Primary Examiner* — Terrance L Kenerly
(74) *Attorney, Agent, or Firm* — Rimon P.C.

(57) ABSTRACT

The rotor includes a rotary shaft, a rotor core, and a plurality of permanent magnets. The stator includes a stator core and a plurality of coils. The stator core has a first contact surface. A normal vector to the first contact surface is aligned with a radially inward direction defined for the rotary shaft. A bearing holder (first bearing holder) has a second contact surface in contact with the first contact surface. A normal vector to the second contact surface is aligned with a radially outward direction defined for the rotary shaft. The bearing holder is positioned by bringing the first contact surface into contact with the second contact surface.

13 Claims, 15 Drawing Sheets

(51) Int. Cl.
  *H02K 5/173* (2006.01)
  *H02K 7/08* (2006.01)
  *H02K 7/14* (2006.01)
  *H02K 21/16* (2006.01)

(52) U.S. Cl.
  CPC ............... *H02K 9/06* (2013.01); *H02K 21/16* (2013.01); *H02K 2203/12* (2013.01)

(58) Field of Classification Search
  USPC .......................................... 310/50, 90, 194
  See application file for complete search history.

(56) References Cited

U.S. PATENT DOCUMENTS

| | | | |
|---|---|---|---|
| 6,211,587 B1 | 4/2001 | Enomoto et al. | |
| 2004/0256933 A1* | 12/2004 | Toyokawa | H02K 5/1675 |
| | | | 310/89 |
| 2006/0267432 A1* | 11/2006 | Archer | H02K 11/33 |
| | | | 310/89 |
| 2010/0244602 A1 | 9/2010 | Perret et al. | |
| 2015/0333592 A1* | 11/2015 | Yin | F16C 35/063 |
| | | | 310/90 |
| 2017/0264179 A1* | 9/2017 | Khotsyanov | H02K 5/132 |
| 2017/0288499 A1* | 10/2017 | Beyerl | H02K 7/116 |
| 2018/0342925 A1 | 11/2018 | Horii et al. | |
| 2019/0280554 A1 | 9/2019 | Hashimoto et al. | |
| 2020/0119600 A1 | 4/2020 | Inuzuka | |
| 2020/0186008 A1 | 6/2020 | Murakami et al. | |

FOREIGN PATENT DOCUMENTS

| | | | |
|---|---|---|---|
| EP | 2093865 A2 | 8/2009 | |
| EP | 2237396 A1 | 10/2010 | |
| GB | 2426636 | * 11/2006 | ........... H02K 5/1732 |
| JP | 2015-163038 A | 9/2015 | |
| JP | 2018-201303 A | 12/2018 | |
| JP | 2018-202500 A | 12/2018 | |
| JP | 2019-004602 A | 1/2019 | |
| JP | 2019-161774 A | 9/2019 | |
| WO | 2018/146241 A1 | 8/2018 | |

OTHER PUBLICATIONS

International Search Report dated Mar. 30, 2021 issued in International Patent Application No. PCT/JP2021/002446, with English translation.

* cited by examiner

BRUSHLESS MOTOR AND ELECTRIC TOOL

CROSS-REFERENCE OF RELATED APPLICATIONS

This application is the U.S. National Phase under 35 U.S.C. § 371 of International Patent Application No. PCT/JP2021/002446, filed on Jan. 25, 2021, which in turn claims the benefit of Japanese Patent Application No. 2020-037217, filed on Mar. 4, 2020, the entire disclosures of which Applications are incorporated by reference herein.

TECHNICAL FIELD

The present disclosure generally relates to a brushless motor and an electric tool. More particularly, the present disclosure relates to a brushless motor including a bearing that rotatably supports a rotary shaft of a rotor and an electric tool including such a brushless motor.

BACKGROUND ART

Patent Literature 1 discloses an electric tool including a housing (electric tool body) and a motor unit. The motor unit includes a stator and a rotor. The rotor forms an integral part of a motor shaft. The housing includes, as members for assembling the motor unit onto the housing itself, two motor holders and two bearing holders. The two motor holders are rib members which are provided to protrude from an inner peripheral surface of the housing and hold the outer periphery of the motor unit. The two bearing holders are rib members which are provided to protrude from the inner peripheral surface of the housing and to hold respective outer peripheries of a first bearing and a second bearing that support the motor shaft.

In the electric tool of Patent Literature 1, however, a decline may be caused in the accuracy of the rotor-stator gap due to, for example, backlash left when the motor unit, the first bearing, and the second bearing are assembled with the housing. Thus, the electric tool of Patent Literature 1 still has room for improvement in this respect.

CITATION LIST

Patent Literature

Patent Literature 1: JP 2018-202500 A

SUMMARY OF INVENTION

It is therefore an object of the present disclosure to provide a brushless motor and an electric tool, both of which are configured to improve the accuracy of the rotor-stator gap.

A brushless motor according to an aspect of the present disclosure includes a rotor, a stator, a bearing, and a bearing holder. The rotor includes a rotary shaft, a rotor core, and a plurality of permanent magnets. The rotor core holds the rotary shaft. The plurality of permanent magnets are held by the rotor core. The stator includes a stator core and a plurality of coils. The stator core is arranged to surround the rotor. The plurality of coils are wound around the stator core. The bearing supports the rotary shaft rotatably. The bearing holder holds the bearing. The stator core has a first contact surface. A normal vector to the first contact surface is aligned with a radially inward direction defined for the rotary shaft. The bearing holder has a second contact surface in contact with the first contact surface. A normal vector to the second contact surface is aligned with a radially outward direction defined for the rotary shaft. The bearing holder is positioned by bringing the first contact surface into contact with the second contact surface.

An electric tool according to another aspect of the present disclosure includes the brushless motor described above and an electric tool body. The electric tool body houses the brushless motor therein.

DESCRIPTION OF EMBODIMENTS

Embodiment

Figure 1:
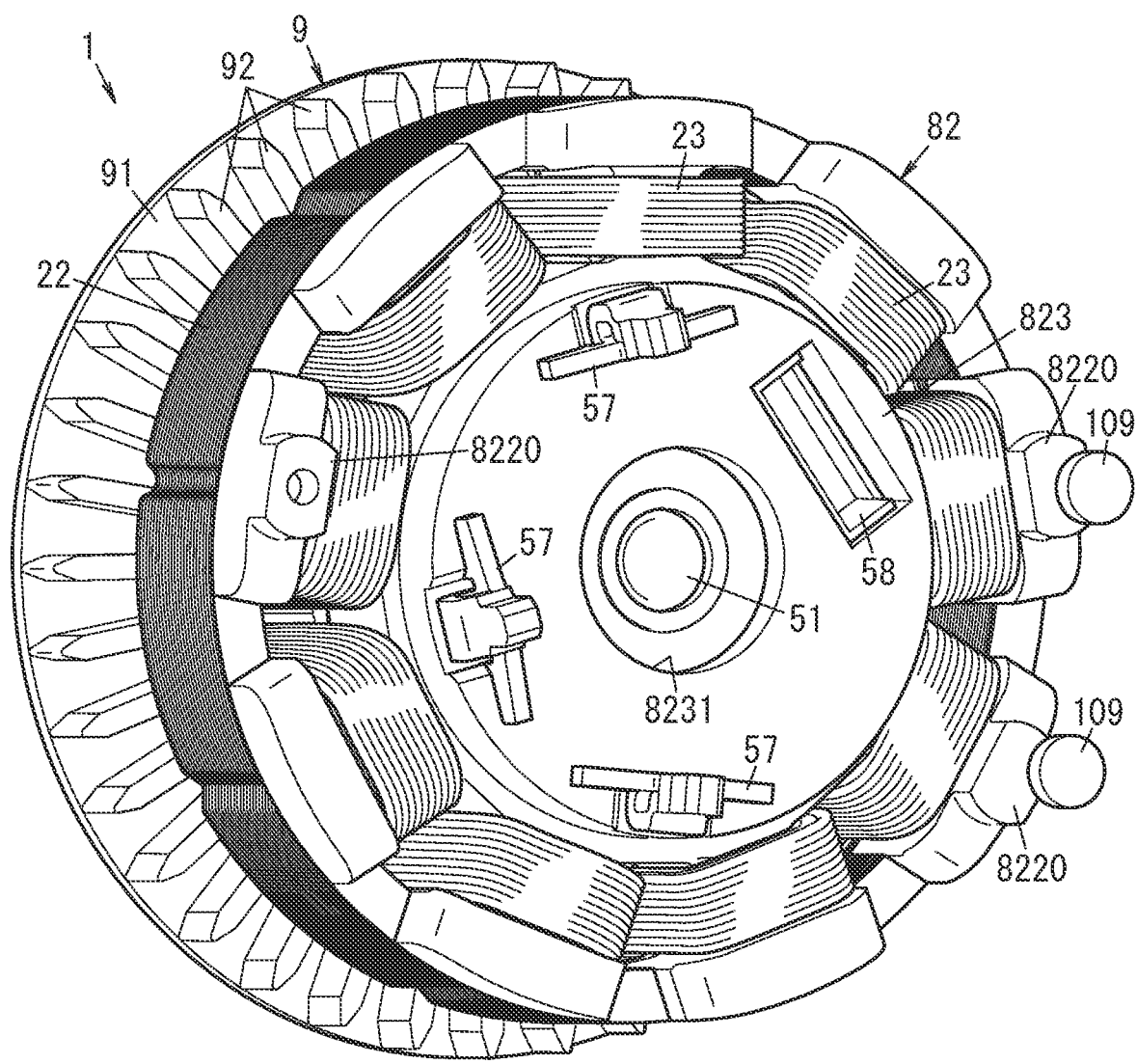
FIG. 1 is a perspective view of a brushless motor according to an exemplary embodiment as viewed obliquely from behind the brushless motor.

A brushless motor 1 and electric tool 10 according to an embodiment will be described with reference to the accompanying drawings. Note that the embodiment to be described below is only an exemplary one of various embodiments of the present disclosure and should not be construed as limiting. Rather, the exemplary embodiment may be readily modified in various manners depending on a design choice or any other factor without departing from the scope of the present disclosure. Also, the drawings to be referred to in the following description of embodiments are all schematic representations. Thus, the ratio of the dimensions (including thicknesses) of respective constituent elements illustrated on the drawings does not always reflect their actual dimensional ratio.

(1) Overview of Brushless Motor

The brushless motor 1 may be provided for, for example, an electric tool 10, an electric bicycle, an electric assist bicycle, or an electric vehicle. In the following description of embodiments, the brushless motor 1 is supposed to be provided for the electric tool 10 as an example.

As shown in FIGS. 1-5, a brushless motor 1 according to an exemplary embodiment includes a rotor 5, a stator 2, a bearing (first bearing 53), and a bearing holder (first bearing holder 7). The rotor 5 includes a rotary shaft 51, a rotor core 6, and a plurality of permanent magnets 52. The rotor core 6 holds the rotary shaft 51. The plurality of permanent magnets 52 are held by the rotor core 6. The stator 2 includes a stator core 20 and a plurality of coils 23. The stator core 20 is arranged to surround the rotor 5. The plurality of coils 23 are wound around the stator core 20. The bearing supports the rotary shaft 51 rotatably. The bearing holder holds the bearing. The stator core 20 has a first contact surface 31. A normal vector to the first contact surface 31 is aligned with a radially inward direction defined for the rotary shaft 51. The bearing holder has a second contact surface 720 in contact with the first contact surface 31. A normal vector to the second contact surface 720 is aligned with a radially outward direction defined for the rotary shaft 51. The bearing holder is positioned by bringing the first contact surface 31 into contact with the second contact surface 720.

According to this configuration, the bearing holder (first bearing holder 7) is positioned by bringing the first contact surface 31 into contact with the second contact surface 720. That is to say, the bearing holder and the bearing (first bearing 53) held by the bearing holder are positioned by the stator core 20. The bearing supports the rotary shaft 51 of the rotor 5. This improves the accuracy of the gap left between the rotor 5 and the stator 2 compared to a situation where the bearing is not positioned by the stator core 20 (e.g., a situation where the bearing is held by only the electric tool body 108). As used herein, good gap accuracy means that the magnitude of the gap varies little. In addition, this may also reduce, compared to the situation where the bearing is held by only the electric tool body 108, the chances of the accuracy of assembling between the electric tool body 108 and the brushless motor 1 (such as presence or absence of backlash between them), for example, affecting the accuracy of the gap left between the rotor 5 and the stator 2.

In addition, according to this configuration, the first contact surface 31 and the second contact surface 720 are in contact with each other along the radius of the rotary shaft 51, thus reducing the chances of causing misalignment between the rotor 5 and the stator 2. Consequently, this further improves the accuracy of the gap left between the rotor 5 and the stator 2.

Furthermore, the brushless motor 1 according to this embodiment is housed in an electric tool body 108 (see FIG. 8) of the electric tool 10. The brushless motor 1 includes a rotor 5, a stator 2, a first bearing 53, and a second bearing 54. The rotor 5 includes a rotary shaft 51, a rotor core 6, and a plurality of permanent magnets 52. The rotor core 6 holds the rotary shaft 51. The plurality of permanent magnets 52 are held by the rotor core 6. The stator 2 includes a stator core 20 and a plurality of coils 23. The stator core 20 is arranged to surround the rotor 5. The plurality of coils 23 are wound around the stator core 20. The first bearing 53 and the second bearing 54 support the rotary shaft 51 rotatably. The rotor core 6 is interposed between the first bearing 53 and the second bearing 54. The first bearing 53 and the second bearing 54 are held by the stator 2.

According to this configuration, the first bearing 53 and second bearing 54 that support the rotary shaft 51 of the rotor 5 are both held by the stator 2. This may reduce the chances of the accuracy of assembling between the electric tool body 108 and the brushless motor 1 (such as presence or absence of backlash between them), for example, affecting the accuracy of the gap left between the rotor 5 and the stator 2, compared to a situation where at least one of the first bearing 53 or the second bearing 54 is held by the electric tool body 108. That is to say, this improves the accuracy of the gap left between the rotor 5 and the stator 2.

(2) Electric Tool

Figure 8:
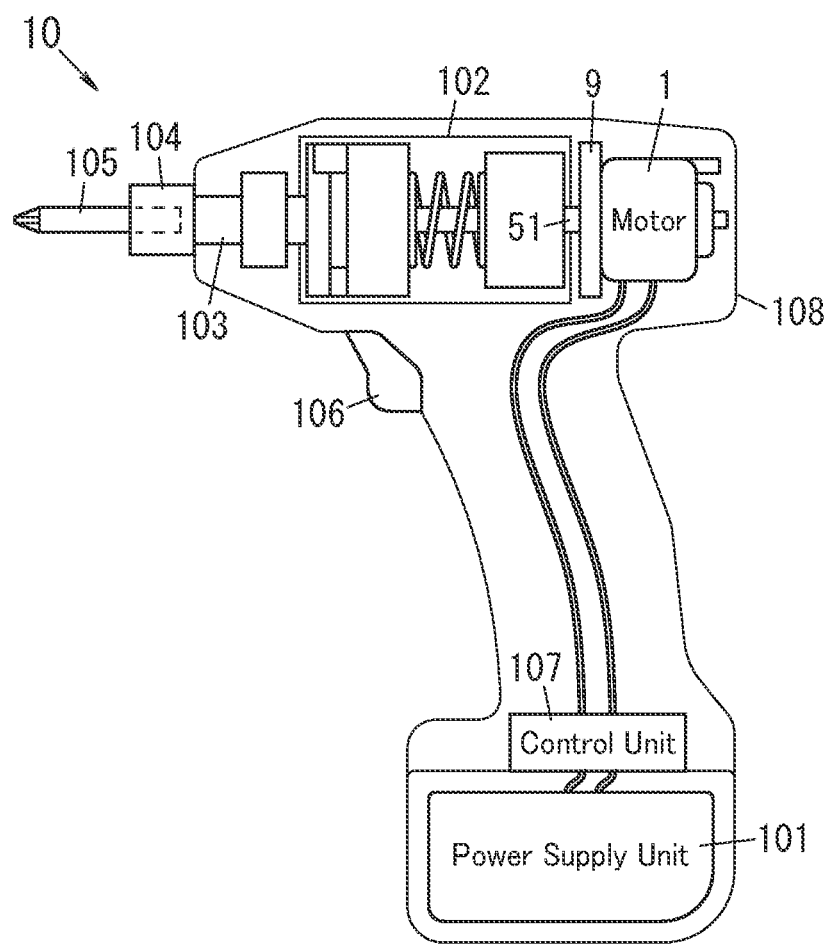
FIG. 8 is a schematic representation of an electric tool including the brushless motor.

As shown in FIG. 8, the electric tool 10 includes the brushless motor 1 and an electric tool body 108. The electric tool 10 further includes a power supply unit 101, a driving force transmission unit 102, an output shaft 103, a chuck 104, a tip tool 105, a trigger volume 106, and a control unit 107.

The electric tool body 108 (housing) houses the brushless motor 1 therein. The electric tool body 108 further houses the driving force transmission unit 102, the output shaft 103, and the control unit 107 therein.

The tip tool 105 is attached to the chuck 104. The brushless motor 1 is a driving source for driving the tip tool 105.

The power supply unit 101 is a power supply (DC power supply) for supplying a current to drive the brushless motor 1. The power supply unit 101 may be, for example, a battery pack. The battery pack includes a single or a plurality of secondary batteries. The rotor 5 includes the rotary shaft 51. The driving force of the brushless motor 1 (i.e., the rotational power of the rotor 5) is transmitted to the driving force transmission unit 102 via the rotary shaft 51. The driving force transmission unit 102 regulates the driving force of the brushless motor 1 and supplies the regulated driving force to the output shaft 103. The output shaft 103 is driven (in rotation, for example) with the driving force supplied from the driving force transmission unit 102. The chuck 104 is fixed to the output shaft 103. The chuck 104 allows the tip tool 105 to be attached thereto removably. Examples of the tip tool 105 (also called a "bit") include screwdrivers, sockets, and drills. One of those various types of tip tools 105 is selected depending on the intended use and attached for use to the chuck 104.

The control unit 107 is a circuit for controlling a current supplied from the power supply unit 101 to the plurality of coils 23 (see FIG. 1) of the brushless motor 1. This allows the control unit 107 to control the rotational velocity of the rotor 5 of the brushless motor 1.

The trigger volume 106 is an operating unit for accepting an operating command for controlling the rotation of the rotor 5 of the brushless motor 1. Performing the operation of pulling the trigger volume 106 enables selectively starting or stopping rotating the rotor 5. In addition, adjusting the manipulative variable of the operation of pulling the trigger volume 106 allows the rotational velocity of the rotor 5 to be controlled. That is to say, adjusting the manipulative variable of the operation of pulling the trigger volume 106 allows the rotational velocity of the output shaft 103, which rotates in synch with the rotor 5, to be controlled. The larger the manipulative variable is, the higher the rotational velocity of the rotor 5 and the output shaft 103 becomes. In accordance with the operating command entered through the trigger volume 106, the control unit 107 either starts or stop rotating the rotor 5 and the output shaft 103 and also controls the rotational velocity of the rotor 5 and the output shaft 103. In this electric tool 10, the tip tool 105 is coupled to the output shaft 103 via the chuck 104. Then, the rotational velocity of the rotor 5 and the output shaft 103 is controlled by operating the trigger volume 106, thereby controlling the rotational velocity of the tip tool 105.

Note that the electric tool 10 according to this embodiment includes the chuck 104, thus making the tip tool 105 replaceable depending on the intended use. However, the tip tool 105 does not have to be replaceable. Alternatively, the electric tool 10 may also be designed to allow the user to use only a particular type of tip tool 105.

(3) Overall Configuration for Brushless Motor

Next, a configuration for the brushless motor 1 will be described. In the following description, the direction in which the rotor 5 and the fan 9 (see FIG. 3) to be described later are arranged side by side will be defined to be a forward/backward direction with the fan 9 supposed to be located forward of the rotor 5 and with the rotor 5 supposed to be located backward of the fan 9. Nevertheless, these definitions should not be construed as limiting the direction in which the brushless motor 1 and the electric tool 10 are used.

Figure 3:
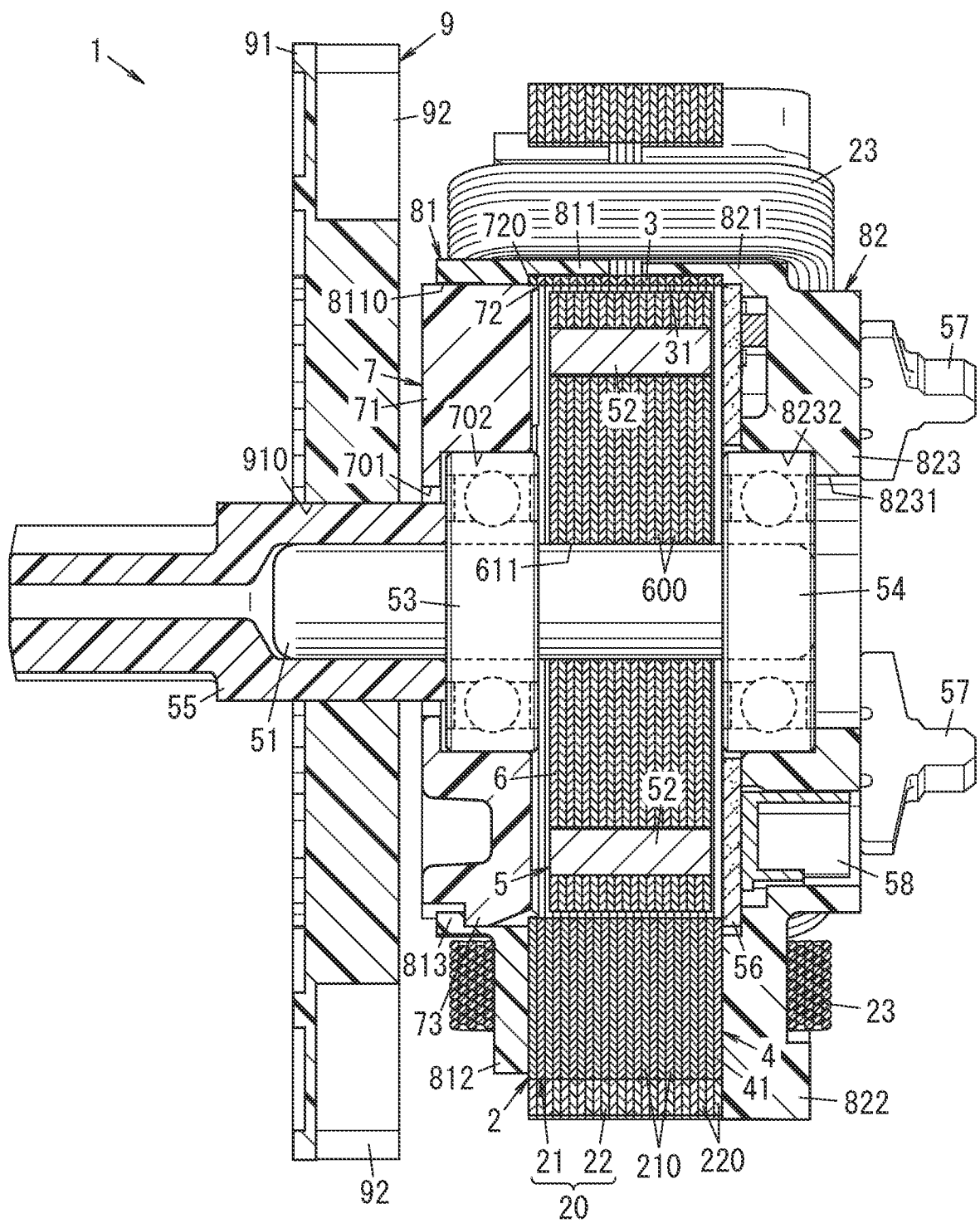
FIG. 3 is a cross-sectional view of the brushless motor.
Figure 5:
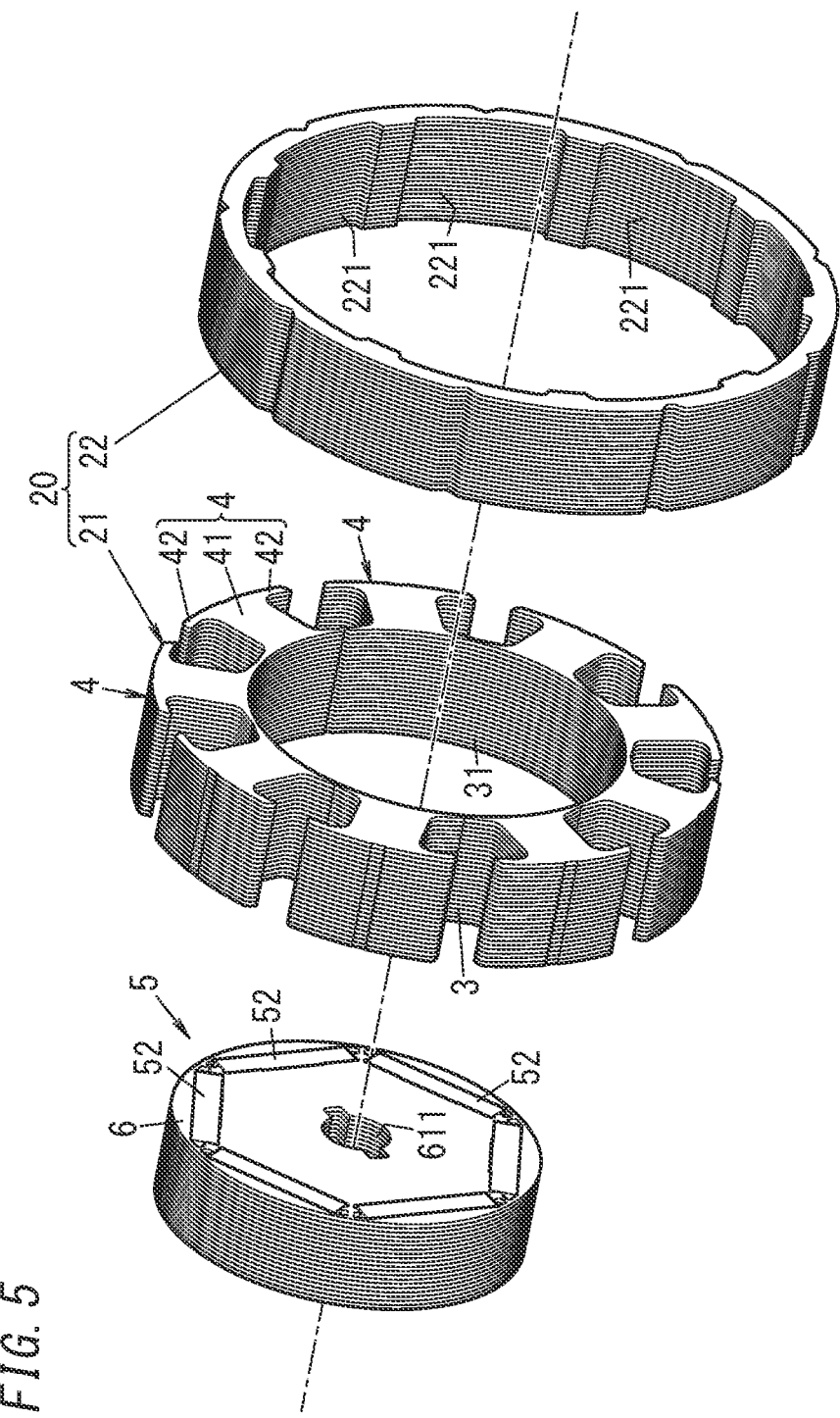
FIG. 5 is an exploded perspective view of a rotor core and stator core of the brushless motor.

As shown in FIGS. 3 and 5, the brushless motor 1 includes the rotor 5, the stator 2, the first bearing 53, the second bearing 54, and the fan 9. The rotor 5 includes the rotary shaft 51, the rotor core 6, and a plurality of (e.g., six in FIG. 5) permanent magnets 52. The plurality of permanent magnets 52 are held by the rotor core 6. The stator 2 includes the stator core 20, a plurality of (e.g., nine in FIG. 1) coils 23, a plurality of (e.g., two in FIG. 6) coil bobbins 81, 82, and a first bearing holder 7. The stator core 20 is disposed around the rotor core 6. That is to say, the stator core 20 surrounds the rotor core 6. The plurality of coils 23 are wound around the stator core 20.

The rotor 5 rotates with respect to the stator 2. Specifically, the magnetic flux generated from the plurality of coils 23 is applied to the plurality of permanent magnets 52, thus causing the rotor 5 to rotate. The rotational power (driving force) of the rotor 5 is transmitted from the rotary shaft 51 to the driving force transmission unit 102 (see FIG. 8).

As shown in FIG. 3, the rotor core 6 includes a plurality of steel sheets 600. The plurality of steel sheets 600 are stacked one on top of another in the thickness direction. The plurality of steel sheets 600 each have the same shape.

The stator core 20 includes a plurality of steel sheets 210 and a plurality of steel sheets 220.

The plurality of steel sheets 210 are stacked one on top of another in the thickness direction. The plurality of steel sheets 210 each have the same shape. The plurality of steel sheets 210 forms a central core 21 (to be described later) of the stator core 20.

The plurality of steel sheets 220 are stacked one on top of another in the thickness direction. The plurality of steel sheets 220 each have the same shape. The plurality of steel sheets 220 forms an outer cylindrical portion 22 (to be described later) of the stator core 20.

As can be seen, the stator core 20 and the rotor core 6 each include a plurality of steel sheets. Each of the stator core 20 and the rotor core 6 is formed by stacking the plurality of steel sheets one on top of another in the thickness direction. In other words, each of the stator core 20 and the rotor core 6 is a so-called "laminated core." Each of the plurality of steel sheets has its surface covered with an insulating coating. The plurality of steel sheets are coupled to each other by welding together each pair of steel sheets that are adjacent to each other in the thickness direction. The direction in which the plurality of steel sheets are stacked one on top of another is aligned with the axis of the rotary shaft 51 of the rotor 5 (that is the longitudinal axis of the rotary shaft 51, i.e., the forward/backward direction). More specifically, each steel sheet is an electrical steel sheet. Each steel sheet is made of a magnetic material. Each steel sheet may be, for example, a silicon steel sheet.

The stator core 20 is thicker than the rotor core 6. The inner peripheral surface of the stator core 20 faces the outer peripheral surface of the rotor core 6 with a gap of a predetermined dimension left between these peripheral surfaces. The gap may have a dimension of 0.2 mm to 0.6 mm, for example.

(4) Rotor

As shown in FIGS. 3 and 5, the rotor 5 includes the rotor core 6 having a circular cylindrical shape, the plurality of (e.g., six in FIG. 5) permanent magnets 52, and the rotary shaft 51.

When viewed along the axis of the rotary shaft 51, the rotor core 6 is concentric with the rotary shaft 51. The rotary shaft 51 is held inside the rotor core 6. More specifically, the rotor core 6 has, as its center hole, a shaft hole 611, through which the rotary shaft 51 is passed. The rotor core 6 and the rotary shaft 51 rotate along with each other.

In the rotor core 6, housed are the plurality of permanent magnets 52. That is to say, the brushless motor 1 has a so-called "interior permanent magnet (IPM)" structure in which the plurality of permanent magnets 52 are embedded in the rotor core 6.

Each of the plurality of permanent magnets 52 may be, for example, embedded in the rotor core 6 with an adhesive applied thereto and thereby held by the rotor core 6. Alternatively, each of the plurality of permanent magnets 52 may also be held with magnetic attraction force produced between the magnet 52 and the rotor core 6 with no adhesive applied between them.

Each permanent magnet 52 has a rectangular parallelepiped shape. When viewed along the axis of the rotary shaft 51, each permanent magnet 52 has a rectangular shape. The plurality of permanent magnets 52 are arranged around the rotary shaft 51 and along the circumference of the rotary shaft 51. More specifically, the plurality of permanent magnets 52 are arranged around the rotary shaft 51 to form a polygonal (e.g., a regular hexagonal) pattern. When viewed along the axis of the rotary shaft 51, the latitudinal axis of each permanent magnet 52 is aligned with the radius of the rotary shaft 51. Each permanent magnet 52 is magnetized along the latitudinal axis thereof. Each pair of permanent magnets 52 that are adjacent to each other are arranged with mutually different magnetic poles facing outward with respect to the rotor core 6.

Each permanent magnet 52 may be, for example, a neodymium magnet, a ferrite magnet, or a plastic magnet, for example.

(5) Stator

As shown in FIG. 5, the stator core 20 of the stator 2 includes a central core 21 and an outer cylindrical portion 22. The stator core 20 is formed by coupling the central core 21 and the outer cylindrical portion 22 to each other.

The central core 21 includes an inner cylindrical portion 3 having a circular cylindrical shape and a plurality of (e.g., nine in FIG. 5) teeth 4. The inner cylindrical portion 3 and the plurality of teeth 4 are formed integrally with each other.

When viewed along the axis of the rotary shaft 51, the inner cylindrical portion 3 is concentric with the rotary shaft 51. The rotor core 6 is disposed inside the inner cylindrical portion 3. The inner cylindrical portion 3 has a first contact surface 31. The first contact surface 31 is an inner peripheral surface of the inner cylindrical portion 3. Thus, a normal vector to the first contact surface 31 is aligned with a radially inward direction defined for the rotary shaft 51. The first contact surface 31 is present along the entire circumference of the inner cylindrical portion 3. The first contact surface 31 is in contact with the second contact surface 720 (see FIG. 4) of the first bearing holder 7.

Each of the plurality of teeth 4 includes a body portion 41 and two tip pieces 42. The body portion 41 protrudes, from the inner cylindrical portion 3, in the radially outward direction for the inner cylindrical portion 3. The respective body portions 41 of the plurality of teeth 4 are arranged at regular intervals along the circumference of the inner cylindrical portion 3. The two tip pieces 42 extend, from a tip part of the body portion 41, in a direction intersecting with a direction in which the body portion 41 protrudes.

As used herein, if two or more members are arranged "at regular intervals," those members may naturally be arranged at exactly the same intervals, but their intervals may also be different from each other within a tolerance range.

The two tip pieces 42 are provided as a stopper for reducing the chances of the coil 23 coming off the body portion 41. Specifically, having the coil 23 caught in the two tip pieces 42 while the coil 23 is moving toward a tip part of the body portion 41 reduces the chances of the coil 23 coming off.

The outer cylindrical portion 22 has a cylindrical shape. More specifically, the outer cylindrical portion 22 has a circular cylindrical shape. When viewed along the axis of the rotary shaft 51, the outer cylindrical portion 22 is concentric with the rotary shaft 51. The outer cylindrical portion 22 surrounds the central core 21. The outer cylindrical portion 22 is attached to the respective tips of the plurality of teeth 4 of the central core 21. That is to say, the plurality of teeth 4 are provided to protrude from the outer cylindrical portion 22 toward the rotor core 6.

The outer cylindrical portion 22 includes a plurality of (e.g., nine in FIG.) fitting portions 221. In other words, the outer cylindrical portion 22 includes as many fitting portions 221 as the teeth 4. Each of the plurality of fitting portions 221 is a recess provided on the inner peripheral surface of the outer cylindrical portion 22. The plurality of fitting portions 221 are arranged at regular intervals along the circumference of the outer cylindrical portion 22. The plurality of fitting portions 221 correspond one to one to the plurality of teeth 4. Each of the plurality of fitting portions 221 and a corresponding one of the plurality of teeth 4 are fitted into each other. This allows the outer cylindrical portion 22 to be coupled to the central core 21. More specifically, a portion, including the two tip pieces 42, of each tooth 4 is fitted into a corresponding one of the fitting portions 221.

Figure 6:
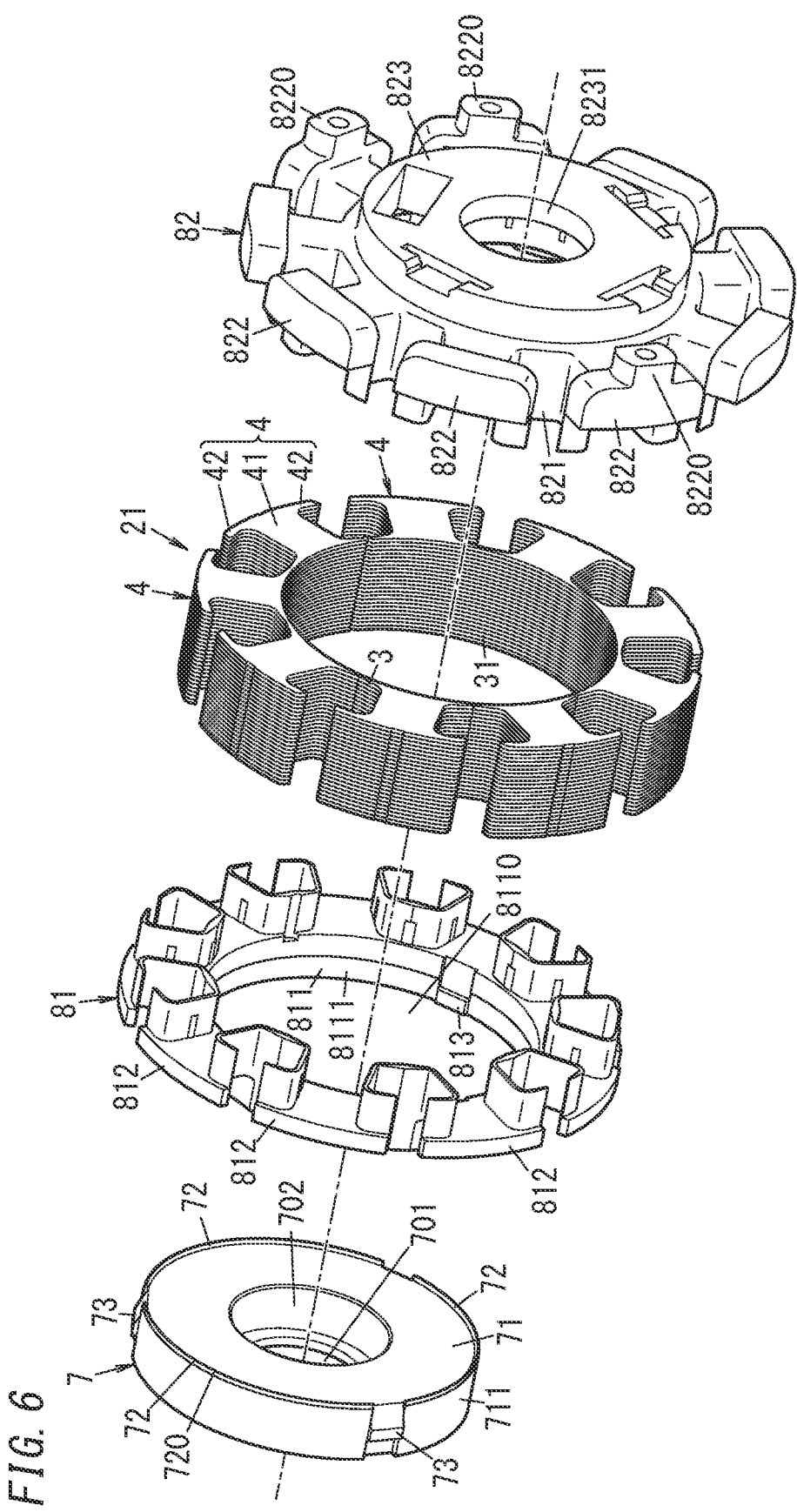
FIG. 6 is an exploded perspective view of main parts of the brushless motor as viewed obliquely from behind the brushless motor.
Figure 7:
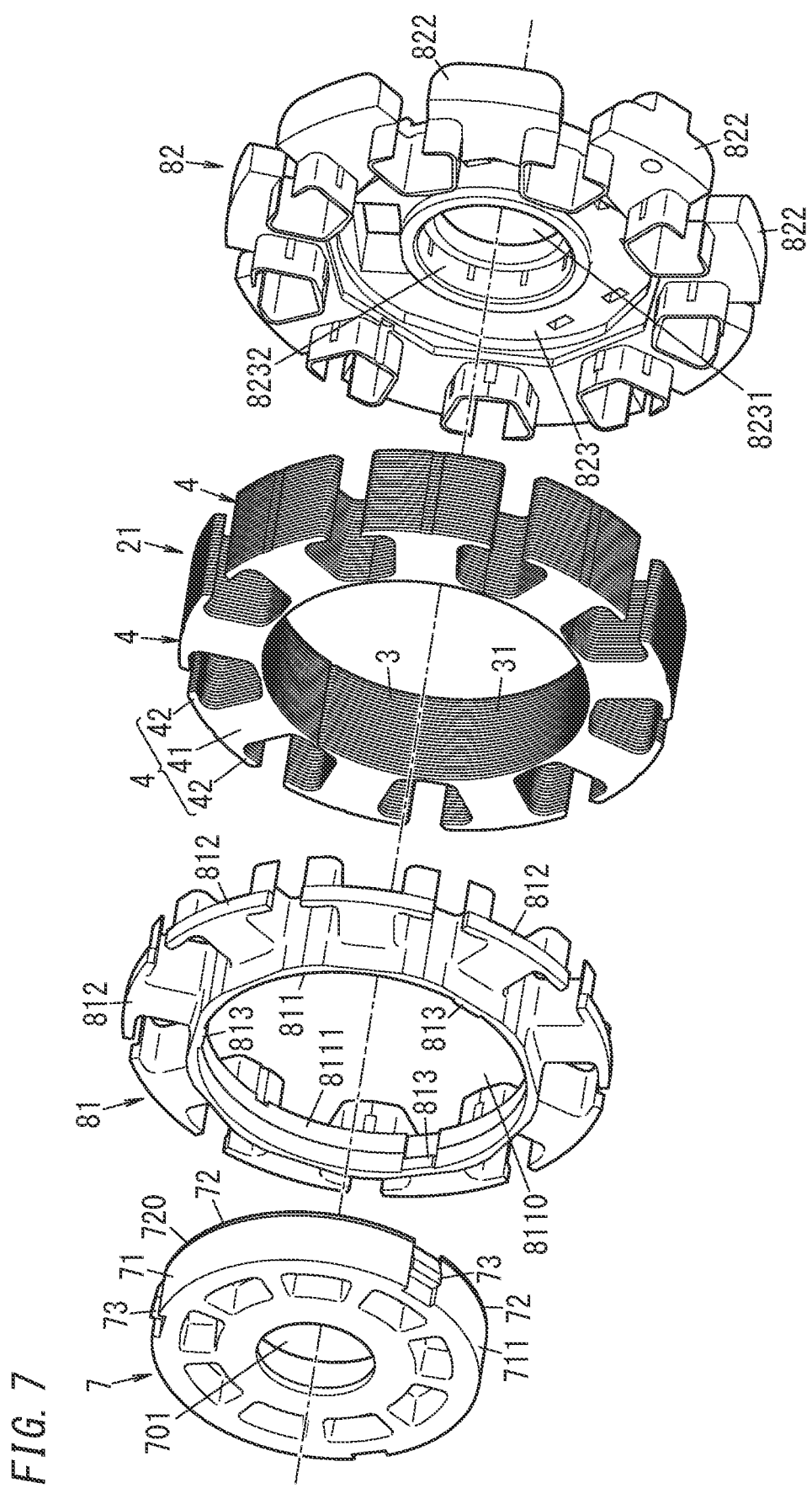
FIG. 7 is an exploded perspective view of the main parts of the brushless motor as viewed obliquely from in front of the brushless motor.

As shown in FIGS. 3, 6, and 7, the stator 2 includes a plurality of (e.g., two in FIG. 6) coil bobbins 81, 82 and a first bearing holder 7. The first bearing holder 7 is attached to the coil bobbin 81.

The coil bobbins 81, 82 may be made of a synthetic resin, for example. The coil bobbins 81, 82 have electrical insulation properties. The coil bobbins 81, 82 are attached to the stator core 20. The coil bobbins 81, 82 are formed integrally with the stator core 20 by insert molding, for example. The coil bobbins 81, 82 cover a region, including the body portion 41, of each of the plurality of teeth 4. More specifically, the coil bobbin 81 covers the region, including the body portion 41, of each of the plurality of teeth 4 from in front of the tooth 4, while the coil bobbin 82 covers the region, including the body portion 41, of each of the plurality of teeth 4 from behind the tooth 4. The coil 23 is wound around each body portion 41 from over the coil bobbins 81, 82. That is to say, the plurality of (nine) coils 23 correspond one to one to the plurality of (nine) teeth 4 and each coil 23 is wound around a corresponding tooth 4 from over the coil bobbins 81, 82. In other words, the respective coils 23 are wound around the teeth 4 of the stator core 20 via the coil bobbins 81, 82. The plurality of coils 23 may be wound by, for example, concentrated winding.

The coil bobbins 81, 82 are out of contact with each other in the forward/backward direction. Thus, in a part around the middle of the thickness of the central core 21 (i.e., in the forward/backward direction), each tooth 4 is not covered with the coil bobbins 81, 82 but exposed. If the number of steel sheets 210 that form the central core 21 (including the plurality of teeth 4 and the inner cylindrical portion 3) is changed, for example, due to a modification of design of the brushless motor 1, the thickness of the central core 21 changes. As the thickness of the central core 21 changes, the distance between the coil bobbins 81, 82 also changes.

The coil bobbin 81 includes: a cylindrical body 811 to overlap with the inner cylindrical portion 3; a plurality of (e.g., nine in FIG. 6) tooth covering portions 812, each of which covers a region, including the body portion 41, of a corresponding one of the plurality of teeth 4; and a plurality of (three, only one of which is shown in FIG. 6) hook portions 813. The cylindrical body 811 is formed in the shape of a circular cylinder, which is concentric with the inner cylindrical portion 3. Each tooth covering portion 812 protrudes, from the cylindrical body 811, in the radially outward direction for the cylindrical body 811. Each tooth covering portion 812 covers its corresponding tooth 4 from in front of the tooth 4 and from both sides along the circumference of the rotary shaft 51. A tip, located opposite from the tip adjacent to the inner cylindrical portion 3, of each tooth 4 (i.e., a part including the two tip pieces 42) is not covered with the coil bobbin 81 but is in contact with the outer cylindrical portion 22.

The plurality of hook portions 813 protrude from the inner peripheral surface of the cylindrical body 811. The plurality of hook portions 813 are arranged at regular intervals along the circumference of the cylindrical body 811. Each of the plurality of hook portions 813 has a hook shape.

The coil bobbin 81 has an opening 8110 inside the cylindrical body 811. The rotary shaft 51 is passed through the opening 8110. The first bearing holder 7 is attached to the coil bobbin 81. The first bearing holder 7 closes the opening 8110. This may reduce the chances of foreign matter entering the space where the rotor core 6 is disposed. Examples of the foreign matter include iron powder involved with the work that has been done using the tip tool 105 (see FIG. 8). The first bearing holder 7 seals the internal space of the opening 8110 hermetically.

The first bearing holder 7 may be made of, for example, a synthetic resin. The first bearing holder 7 has electrical insulation properties. The first bearing holder 7 includes a base 71, a plurality of (e.g., three in FIG. 6) ribs 72, and a plurality of (e.g., three, only two of which are shown in FIG. 6) hook portions 73.

The base 71 has a circular columnar shape. The base 71 has a shaft hole 701 as its center hole. More specifically, the base 71 has a recess 702 on one surface (rear surface) thereof and has the shaft hole 701 provided through the bottom surface of the recess 702. The rotary shaft 51 is passed through the shaft hole 701.

The first bearing holder 7 holds the first bearing 53. More specifically, the first bearing 53 is inserted into the recess 702. A part, located near the outer edge, of the circular cylindrical first bearing 53 is in contact with the inner surface (bottom surface) of the recess 702. On the other hand, a part, located near the inner edge, of the first bearing 53 is present in a region opened by the shaft hole 701, and therefore, is not in contact with the inner surface (bottom surface) of the recess 702.

The plurality of ribs 72 are provided for one surface (rear surface) of the base 71. When viewed in the forward/backward direction, each of the plurality of ribs 72 has an arc shape. The plurality of ribs 72 protrude from the outer edge of the base 71 along the axis of the rotary shaft 51 (i.e., in the forward/backward direction). The plurality of ribs 72 are arranged at regular intervals along the outer edge of the base 71. When taken along a plane that passes through the center of the base 71 and is aligned with the axis of the base 71, each of the plurality of ribs 72 has a generally rectangular triangular cross-sectional shape (see FIG. 3).

Each of the plurality of ribs 72 has the second contact surface 720. The second contact surface 720 is the outer peripheral surface of the rib 72. Thus, a normal vector to the second contact surface 720 is aligned with a radially outward direction defined for the rotary shaft 51. The first contact surface 31 of the (inner cylindrical portion 3 of the) stator core 20 is in contact with the second contact surface 720. The first bearing holder 7 is positioned by bringing the first contact surface 31 into contact with the second contact surface 720. That is to say, the first bearing holder 7 is positioned with respect to the stator core 20. More specifically, the movement of the first bearing holder 7 perpendicularly to the axis of the rotary shaft 51 is regulated.

In this case, since each of the plurality of (three in this example) ribs 72 has the second contact surface 720, the first bearing holder 7 has a plurality of (i.e., three) second contact surfaces 720. The first bearing holder 7 is in contact with the (first contact surface 31 of the) stator core 20 at multiple points (i.e., on the plurality of second contact surfaces 720).

Comparing the respective ends (front ends) of the stator core 20 and the rotor core 6 along the axis of the rotary shaft 51, it can be seen that the one end (front end) of the stator core 20 is located forward of the one end (front end) of the rotor core 6 (see FIG. 3). This ensures a sufficient area of contact between the first contact surface 31 of the stator core 20 and each of the second contact surfaces 720 of the first bearing holder 7.

Figure 4:
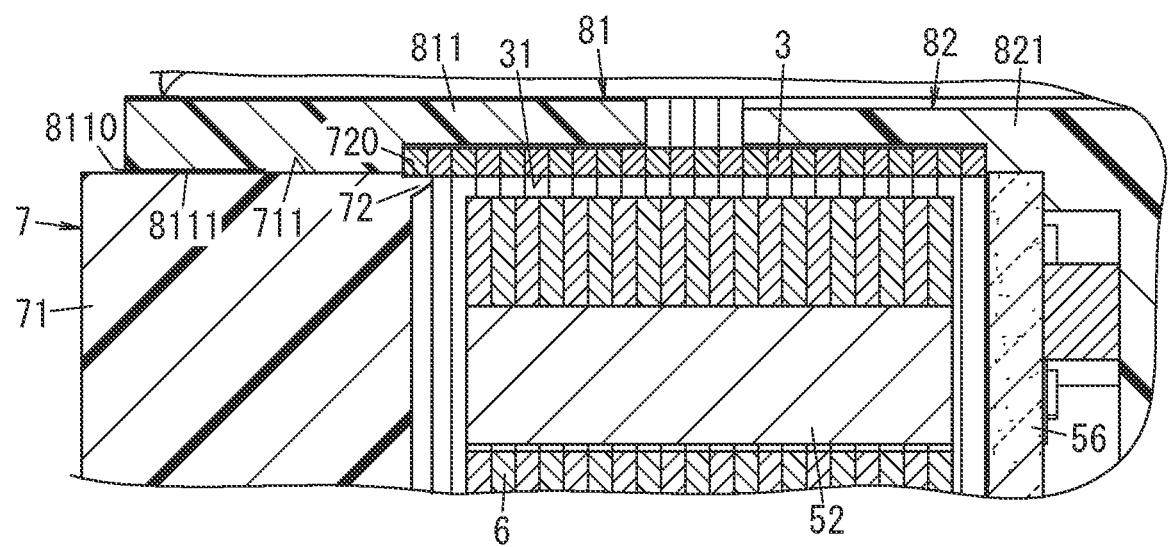
FIG. 4 is an enlarged view of a main part thereof shown in FIG. 3.

The coil bobbin 81 further has a third contact surface 8111 (see FIG. 4). The third contact surface 8111 is the inner surface of the opening 8110. The third contact surface 8111 is flush with the first contact surface 31. The base 71 has a fourth contact surface 711 (see FIG. 4). The fourth contact surface 711 is the outer peripheral surface of the base 71. The third contact surface 8111 is in contact with the fourth contact surface 711.

Note that the second contact surface 720 of each rib 72 may be in contact with not only the first contact surface 31 but also the third contact surface 8111 as well.

The thickness of each rib 72 is smaller than the gap left between the stator core 20 and the rotor core 6. Although each rib 72 is disposed forward of the rotor core 6 in this embodiment, each rib 72 may also be inserted into the gap left between the stator core 20 and the rotor core 6.

The plurality of hook portions 73 protrude from the outer peripheral surface of the base 71. When viewed in the forward/backward direction, each of the hook portions 73 is provided between an associated pair of ribs 72. The plurality of hook portions 73 are arranged at regular intervals along the circumference of the base 71. Each of the plurality of hook portions 73 has a hook shape.

The plurality of hook portions 73 of the first bearing holder 7 correspond one to one to the plurality of hook portions 813 of the coil bobbin 81. The first bearing holder 7 is fitted into the coil bobbin 81 by causing at least one of the first bearing holder 7 or the coil bobbin 81 to move along the axis of the rotary shaft 51. More specifically, each hook portion 73 is hooked onto its corresponding hook portion 813 by causing at least one of the first bearing holder 7 or the coil bobbin 81 to move along the axis of the rotary shaft 51 (see FIG. 3). For example, the first bearing holder 7 may be inserted from in front of the coil bobbin 81 into the opening 8110, thereby causing each hook portion 73 to go over, and be hooked onto, its corresponding hook portion 813. Alternatively, the first bearing holder 7 may be inserted from behind the coil bobbin 81 into the opening 8110, thereby causing each hook portion 73 to be hooked onto its corresponding hook portion 813. As can be seen, at least one member (e.g., both in this example) selected from the first bearing holder 7 and the coil bobbin 81 includes hook portions 73 (or 813) to be hooked onto the other member.

The hook portions 73 (or 813) regulate the movement of the first bearing holder 7 with respect to the coil bobbin 81 along the axis of the rotary shaft 51 (i.e., in the forward/backward direction) to a range in which the second contact surfaces 720 do not come out of contact with the first contact surface 31. That is to say, the range of forward or backward movement of the first bearing holder 7 with respect to the coil bobbin 81 is regulated by having the respective hook portions 73 hooked onto their corresponding hook portions 813.

The coil bobbin 82 includes: a cylindrical body 821 to overlap with the inner cylindrical portion 3; a plurality of (e.g., nine in FIG. 6) tooth covering portions 822, each of which covers a region, including the body portion 41, of a corresponding one of the plurality of teeth 4; and a second bearing holder 823. The cylindrical body 821 is formed in the shape of a circular cylinder, which is concentric with the inner cylindrical portion 3. Each tooth covering portion 822 protrudes, from the cylindrical body 821, in the radially outward direction for the cylindrical body 821. Each tooth covering portion 822 covers its corresponding tooth 4 from behind the tooth 4 and from both sides along the circumference of the rotary shaft 51. A tip, located opposite from the tip adjacent to the inner cylindrical portion 3, of each tooth 4 (i.e., a part including the two tip pieces 42) is not covered with the coil bobbin 82 but is in contact with the outer cylindrical portion 22.

At least some (e.g., three in the example illustrated in FIG. 6) of the nine tooth covering portions 822 are each provided with a boss portion 8220. The boss portion 8220 has a circular cylindrical shape. A screw 109 (see FIG. 1) is inserted into each boss portion 8220. The coil bobbin 82 is attached to the electric tool body 108 (see FIG. 8) via the screws 109.

The second bearing holder 823 has a circular columnar shape. The second bearing holder 823 has a through hole 8231 as its center hole. More specifically, the second bearing holder 823 has a recess 8232 on one surface (front surface) thereof and has the through hole 8231 provided through the bottom surface of the recess 8232.

The second bearing holder 823 holds the second bearing 54. More specifically, the second bearing 54 is inserted into the recess 8232. A part, located near the outer edge, of the circular cylindrical second bearing 54 is in contact with the inner surface (bottom surface) of the recess 8232. On the other hand, a part, located near the inner edge, of the second bearing 54 is present in a region opened by the through hole 8231 and is not in contact with the inner surface (bottom surface) of the recess 8232.

(6) First Bearing and Second Bearing

Each of the first bearing 53 and the second bearing 54 may be, for example, a ball bearing. Each of the first bearing 53 and the second bearing 54 supports the rotary shaft 51 rotatably. As shown in FIG. 3, the rotor core 6 is interposed between the first bearing 53 and the second bearing 54. More specifically, the first bearing 53 is disposed in front of the rotor core 6 and the second bearing 54 is disposed behind the rotor core 6.

In this case, the first bearing holder 7 for holding the first bearing 53 and the second bearing holder 823 for holding the second bearing 54 are held by the stator core 20. More specifically, the first bearing holder 7 is attached to the coil bobbin 81 and the second bearing holder 823 forms part of the coil bobbin 82. The coil bobbins 81, 82 are formed integrally with the stator core 20 by insert molding, for example.

Furthermore, the first bearing 53 and the second bearing 54 are held by the stator 2. More specifically, the first bearing 53 is held by the coil bobbin 81 of the stator 2. That is to say, the first bearing 53 is held by the coil bobbin 81 via the first bearing holder 7. On the other hand, the second bearing 54 is directly held by the coil bobbin 82 of the stator 2. That is to say, the second bearing 54 is held by the second bearing holder 823 of the coil bobbin 82.

(7) Fan

As shown in FIGS. 3 and 8, the fan 9 is interposed between the rotor core 6 and the driving force transmission unit 102. Also, the first bearing 53 is interposed between the fan 9 and the rotor core 6. The fan 9 is held by the rotary shaft 51. More specifically, the brushless motor 1 includes a cap 55 attached to the rotary shaft 51. The fan 9 is held by the rotary shaft 51 via the cap 55. As the rotary shaft 51 rotates, the fan 9 turns accordingly. Then, the fan 9 produces air (airflow) that flows toward the output shaft 103 (i.e., forward). In this manner, the fan 9 cools the internal space of the electric tool body 108 with the air.

Figure 2:
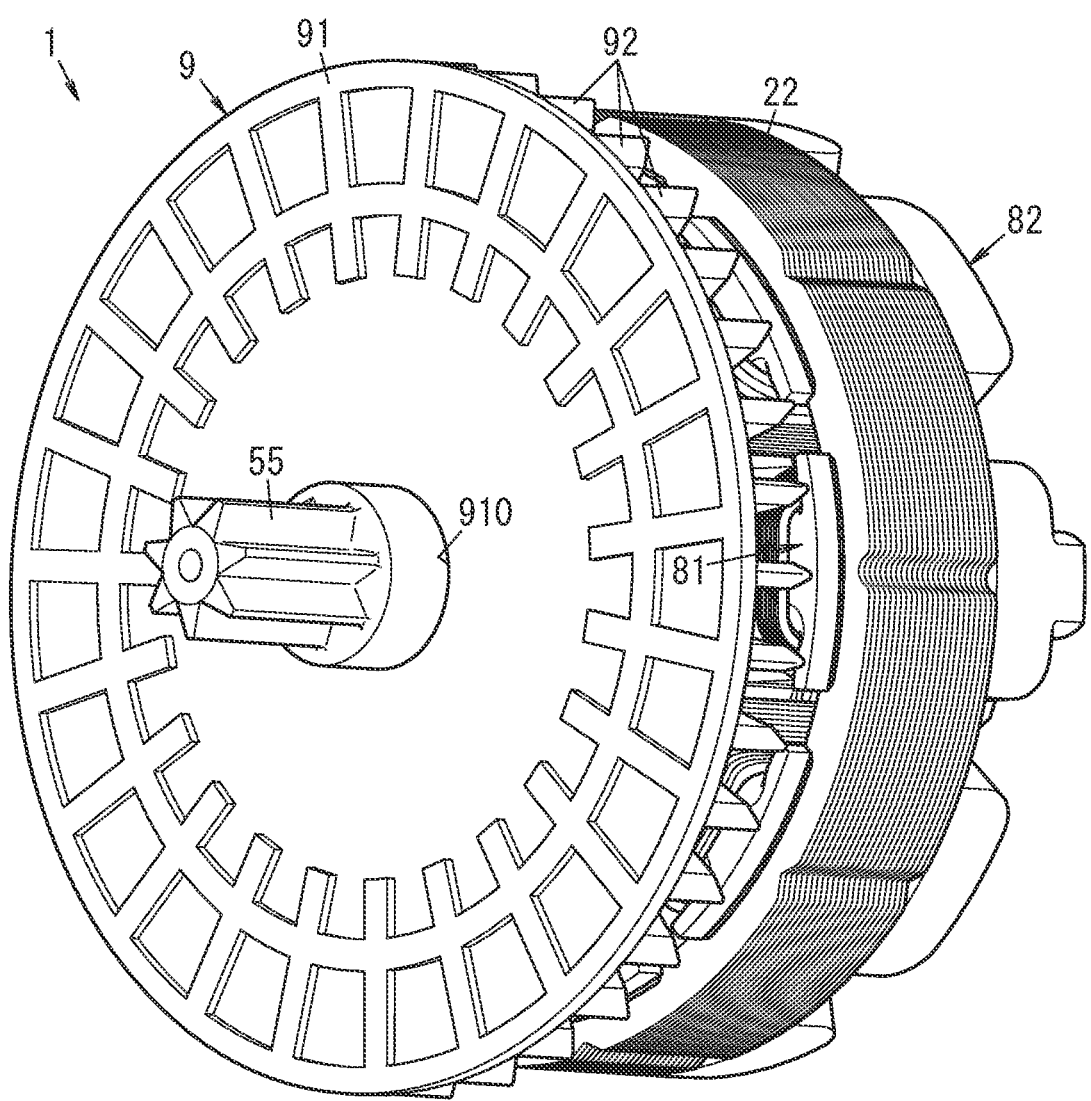
FIG. 2 is a perspective view of the brushless motor as viewed obliquely from in front of the brushless motor.

As shown in FIGS. 1 and 2, the fan 9 has a circular shape when viewed in the forward/backward direction. The fan 9 includes a disk portion 91 and a plurality of blades 92. The disk portion 91 has a shaft hole 910 as its center hole. The rotary shaft 51 is passed through the shaft hole 910. The plurality of blades 92 are provided for one surface (rear surface) of the disk portion 91 and arranged near the outer edge of the disk portion 91. The longitudinal axis of each of the plurality of blades 92 is aligned with the radius of the disk portion 91.

(8) Board

As shown in FIG. 3, the brushless motor 1 includes a board 56 and a plurality of mounted components mounted on the board 56. The board 56 is held by the second bearing holder 823. The board 56 is interposed between the second bearing holder 823 and the rotor core 6. The board 56 is a sensor board for detecting the rotational angle of the rotor 5. The brushless motor 1 according to this embodiment includes, as the plurality of mounted components, a plurality of (e.g., three) rotation sensors, a plurality of (e.g., three in FIG. 1) first terminal members 57, and a second terminal member 58. The rotation sensors may be, for example, hall elements or giant magneto-resistive effect (GMR) elements, for example. The plurality of first terminal members 57 are electrically connected to the plurality of coils 23. The second terminal member 58 is electrically connected to the power supply unit 101 (see FIG. 8). Each of the first terminal members 57 and the second terminal member 58 is at least partially embedded in the second bearing holder 823 by insert molding, for example.

(9) Advantages

As can be seen from the foregoing description, in the brushless motor 1 according to this embodiment, the first bearing holder 7 is positioned by bringing the first contact surface 31 into contact with the second contact surfaces 720. That is to say, the first bearing holder 7 and the first bearing 53 held by the first bearing holder 7 are positioned by the stator core 20. The first bearing 53 supports the rotary shaft 51 of the rotor 5. This improves the accuracy of the gap left between the rotor 5 and the stator 2 compared to a situation where the first bearing 53 is not positioned by the stator core 20 (e.g., a situation where the first bearing 53 is held by only the electric tool body 108).

In addition, the second contact surfaces 720 of the first bearing holder 7 are in contact with the inner cylindrical portion 3 of the central core 21. This improves the accuracy of the gap left between the inner cylindrical portion 3 and the rotor core 6, compared to a situation where the second contact surfaces 720 are in contact with the outer cylindrical portion 22 attached to the central core 21, for example. Furthermore, the inner cylindrical portion 3 has a circular cylindrical shape, thus making the inner cylindrical portion 3 hardly deformable due to the contact pressure between the first contact surface 31 and the second contact surfaces 720. This further improves the accuracy of the gap left between the rotor 5 and the stator 2.

Furthermore, in the brushless motor 1 according to this embodiment, the first bearing 53 and second bearing 54 that support the rotary shaft 51 of the rotor 5 are both held by the stator 2. This may reduce the chances of the accuracy of assembling between the electric tool body 108 and the brushless motor 1 (such as presence or absence of backlash between them), for example, affecting the accuracy of the gap left between the rotor 5 and the stator 2, compared to a situation where at least one of the first bearing 53 or the second bearing 54 is held by the electric tool body 108. In other words, this improves the accuracy of the gap left between the rotor 5 and the stator 2.

(First Variation)

Next, a brushless motor 1 according to a first variation will be described. In the following description, any constituent element of this first variation, having the same function as a counterpart of the embodiment described above, will be designated by the same reference numeral as that counterpart's, and description thereof will be omitted herein.

In the exemplary embodiment described above, the coil bobbin 82 includes the second bearing holder 823. In this case, the coil bobbins 81, 82 may include at least one of the first bearing holder 7 for holding the first bearing 53 or the second bearing holder 823 for holding the second bearing 54.

That is to say, the first bearing holder 7 may form part of the coil bobbin 81 having electrical insulation properties. In other words, the first bearing holder 7 and the coil bobbin 81 may be formed integrally with each other. More specifically, the first bearing holder 7 and the coil bobbin 81 may be formed as a single member having electrical insulation properties.

(Second Variation)

Next, a brushless motor 1 according to a second variation will be described. In the following description, any constituent element of this second variation, having the same function as a counterpart of the embodiment described above, will be designated by the same reference numeral as that counterpart's, and description thereof will be omitted herein.

In the exemplary embodiment described above, the first bearing holder 7 is attached to the coil bobbin 81. In this case, at least one of the first bearing holder 7 or the second bearing holder 823 may be attached to the coil bobbins 81, 82. That is to say, the coil bobbin 82 may include no second bearing holder 823. In other words, the second bearing holder 823 may be provided separately from the coil bobbin 82. In that case, the second bearing holder 823 may be attached to the coil bobbin 82.

(Third Variation)

Next, a brushless motor 1A according to a third variation will be described with reference to FIGS. 9-12. In the following description, any constituent element of this third variation, having the same function as a counterpart of the embodiment described above, will be designated by the same reference numeral as that counterpart's, and description thereof will be omitted herein.

In this third variation, the first bearing holder 7A has a different shape from the first bearing holder 7 according to the exemplary embodiment described above. In addition, the coil bobbin 81A has a different shape from the coil bobbin 81 according to the exemplary embodiment described above.

The first bearing holder 7A has no ribs 72 (see FIG. 6). The second contact surface 712, designed to come into contact with the first contact surface 31 of the (inner cylindrical portion 3 of the) stator core 20, of the first bearing holder 7A is the outer peripheral surface of the base 71. That is to say, a part, located near the rear end, of the outer peripheral surface of the base 71 is in contact with the first contact surface 31. In addition, the second contact surface 712 is in contact with not only the first contact surface 31 but also the third contact surface 8111 of the coil bobbin 81A as well.

Figure 10:
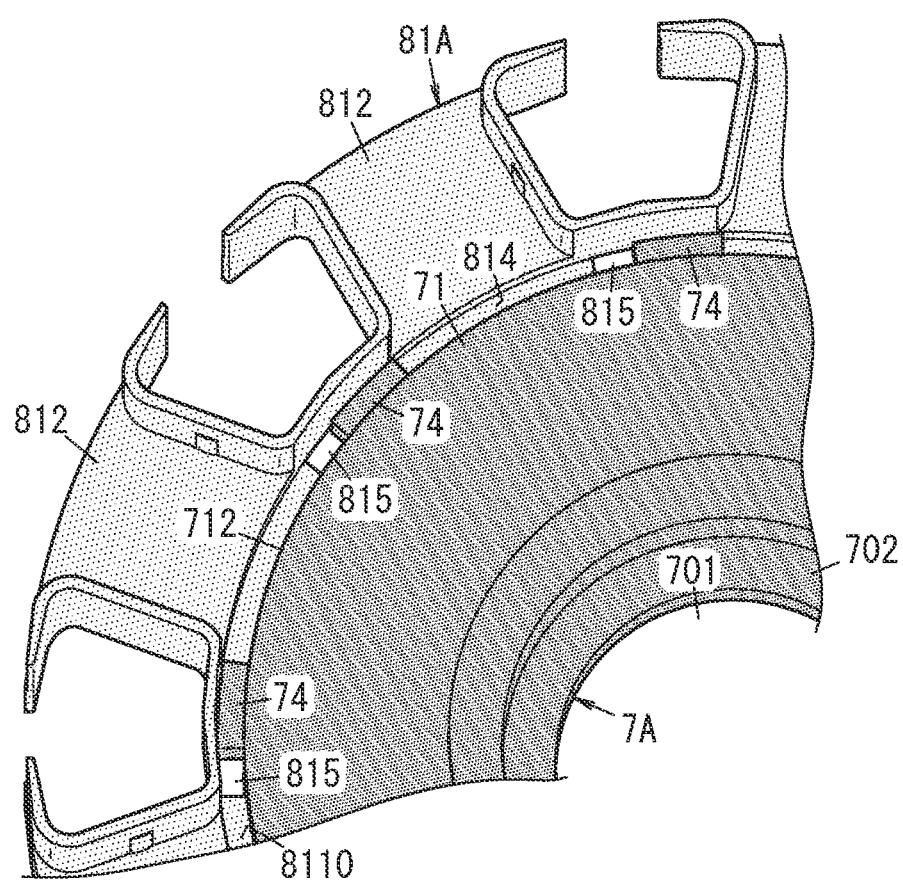
FIG. 10 is a perspective view of a main part of the brushless motor.

As shown in FIG. 10, the first bearing holder 7A includes a plurality of (e.g., nine) hook portions 74 instead of the plurality of hook portions 73. The plurality of hook portions 74 protrude from the outer peripheral surface of the base 71. The plurality of hook portions 74 are arranged at regular intervals along the circumference of the base 71. Each of the plurality of hook portions 74 has a rectangular parallelepiped shape.

The coil bobbin 81A has a catch groove 814 instead of the plurality of hook portions 813 (see FIG. 6). The catch groove 814 is a groove provided on the rear surface of the coil bobbin 81A. When viewed in the forward/backward direction, the catch groove 814 has an annular shape. The catch groove 814 is provided along the inner edge of the opening 8110. A plurality of (e.g., nine, only three of which are shown in FIG. 10) cutouts 815 are provided through the bottom surface of the catch groove 814 to penetrate through the coil bobbin 81A in the forward/backward direction. Also, as shown in FIG. 11, a region, located forward of each cutout 815, of the cylindrical body 811 is a cavity 816.

The first bearing holder 7A is attached to the coil bobbin 81A by rotating at least one member selected from the first bearing holder 7A and the coil bobbin 81A with respect to the other member either in the direction in which the rotary shaft 51 rotates or in the opposite direction thereof. Next, an exemplary procedure in which the first bearing holder 7A is attached to the coil bobbin 81A will be described.

Figure 11:
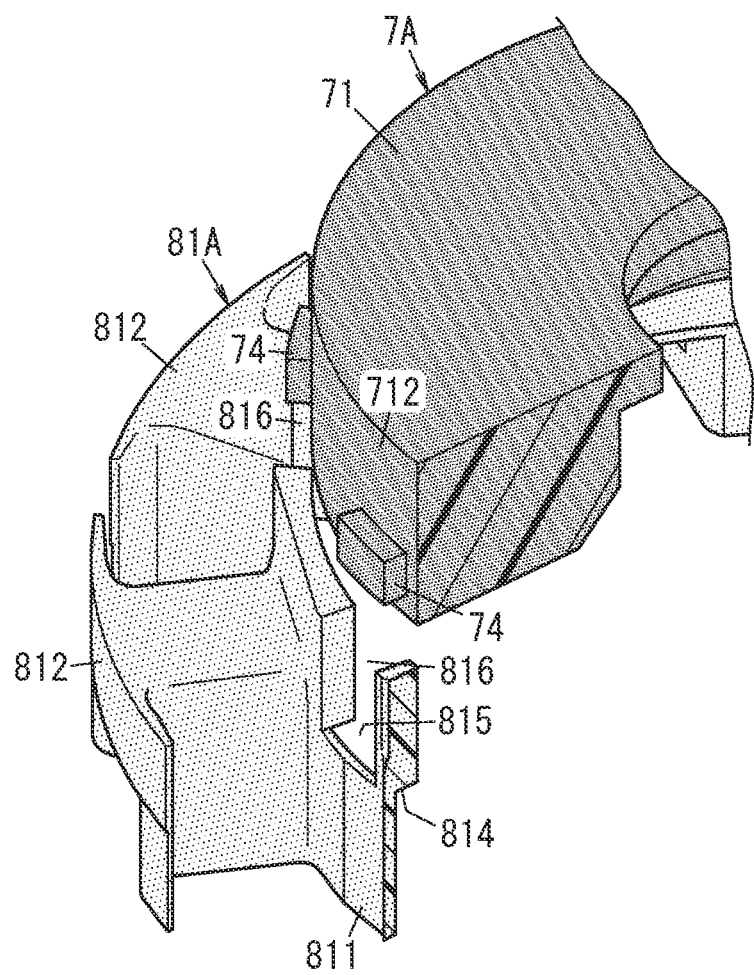
FIG. 11 illustrates an attachment procedure for the main parts of the brushless motor.

First, as shown in FIG. 11, the first bearing holder 7A is placed in front of the coil bobbin 81A. The plurality of hook portions 74 of the first bearing holder 7A correspond one to one to the plurality of cutouts 815 of the coil bobbin 81A. Next, the first bearing holder 7A is moved backward such that each of the hook portions 74 is inserted into its corresponding cutout 815 via the cavity 816 in front of the cutout 815.

Figure 9:
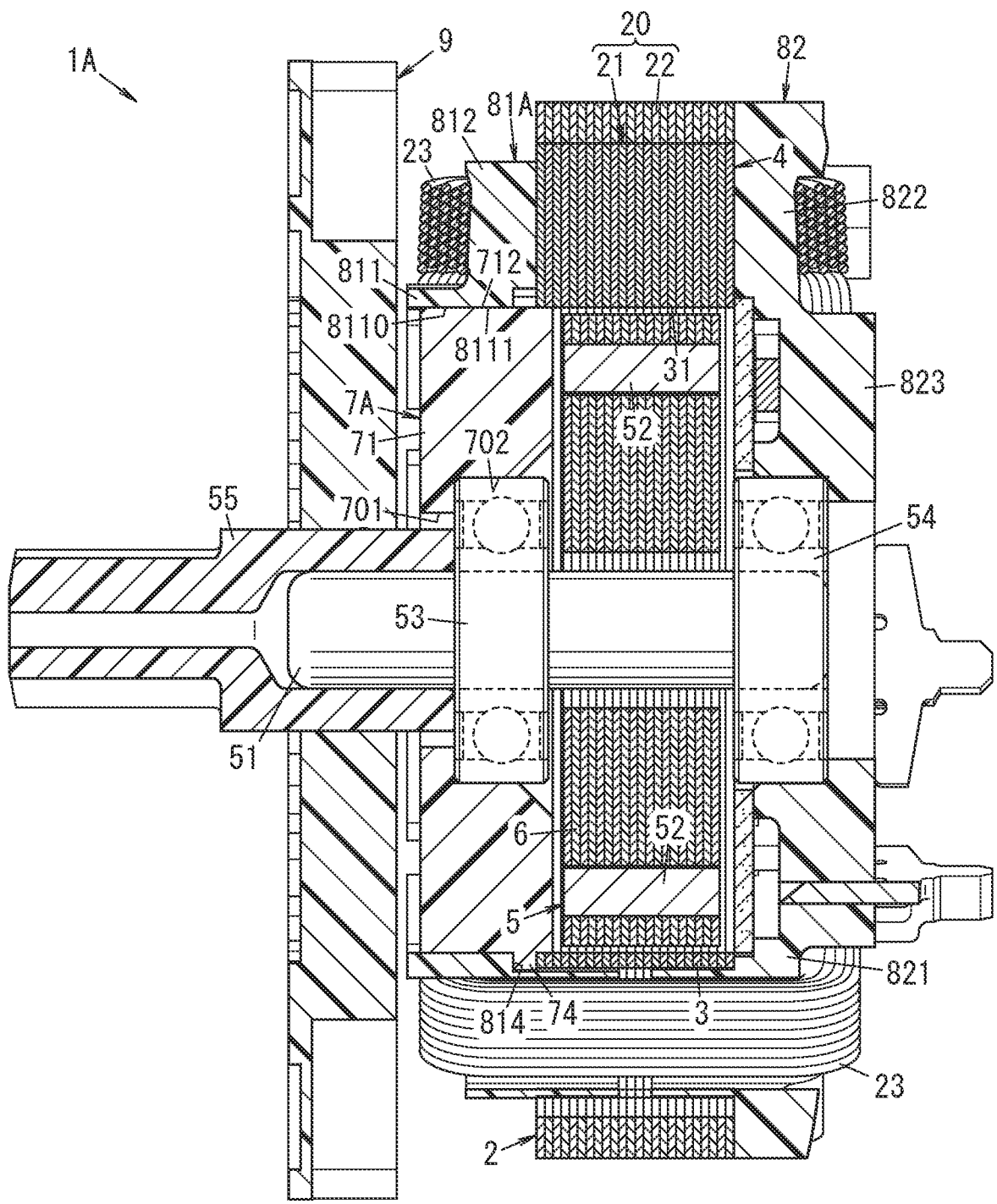
FIG. 9 is a cross-sectional view of a brushless motor according to a third variation.
Figure 12:
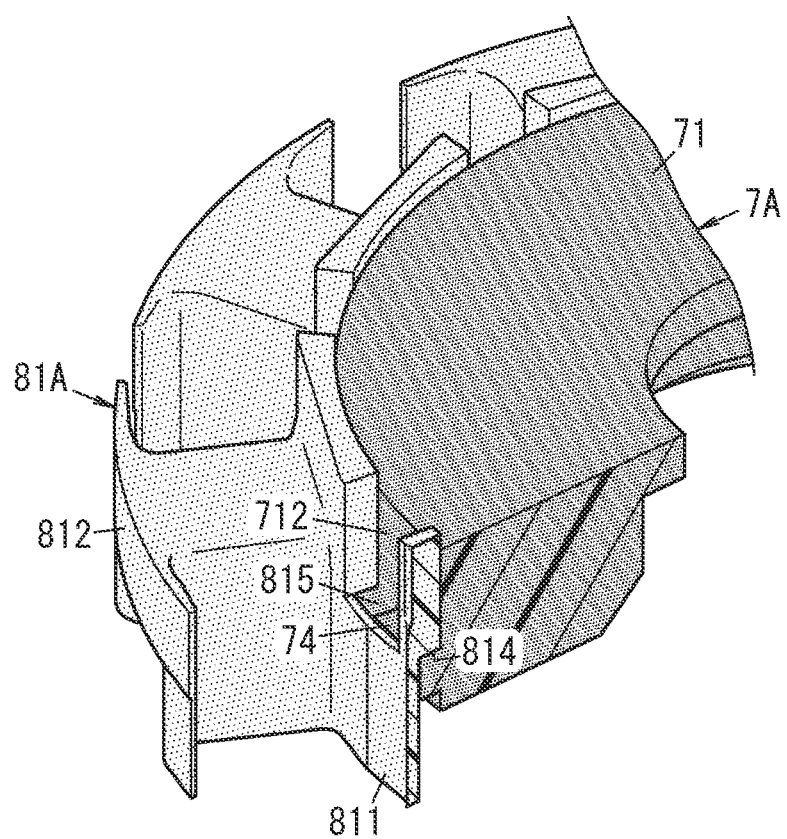
FIG. 12 illustrates the attachment procedure for the main parts of the brushless motor.

Next, the first bearing holder 7A is turned to the direction in which the rotary shaft 51 rotates (or in the opposite direction thereof). As a result, the position of each hook portion 74 changes with respect to its corresponding cutout 815 as shown in FIGS. 12 and 10. That is to say, each hook portion 74 moves to a position where the hook portion 74 is in contact with the bottom surface of the catch groove 814. Consequently, the first bearing holder 7A is attached to the coil bobbin 81A with each hook portion 74 sandwiched between the bottom surface of the catch groove 814 and the front end of the inner cylindrical portion 3 as shown in FIG. 9.

As can be seen, according to this third variation, the first bearing holder 7A is attached to the coil bobbin 81A through a procedure involving rotation. This may reduce the chances of the first bearing holder 7A coming off the coil bobbin 81A.

Alternatively, the first bearing holder 7A may also be attached to the coil bobbin 81A from behind the coil bobbin 81A.

(Reference Example: Fourth Variation)

Figure 13:
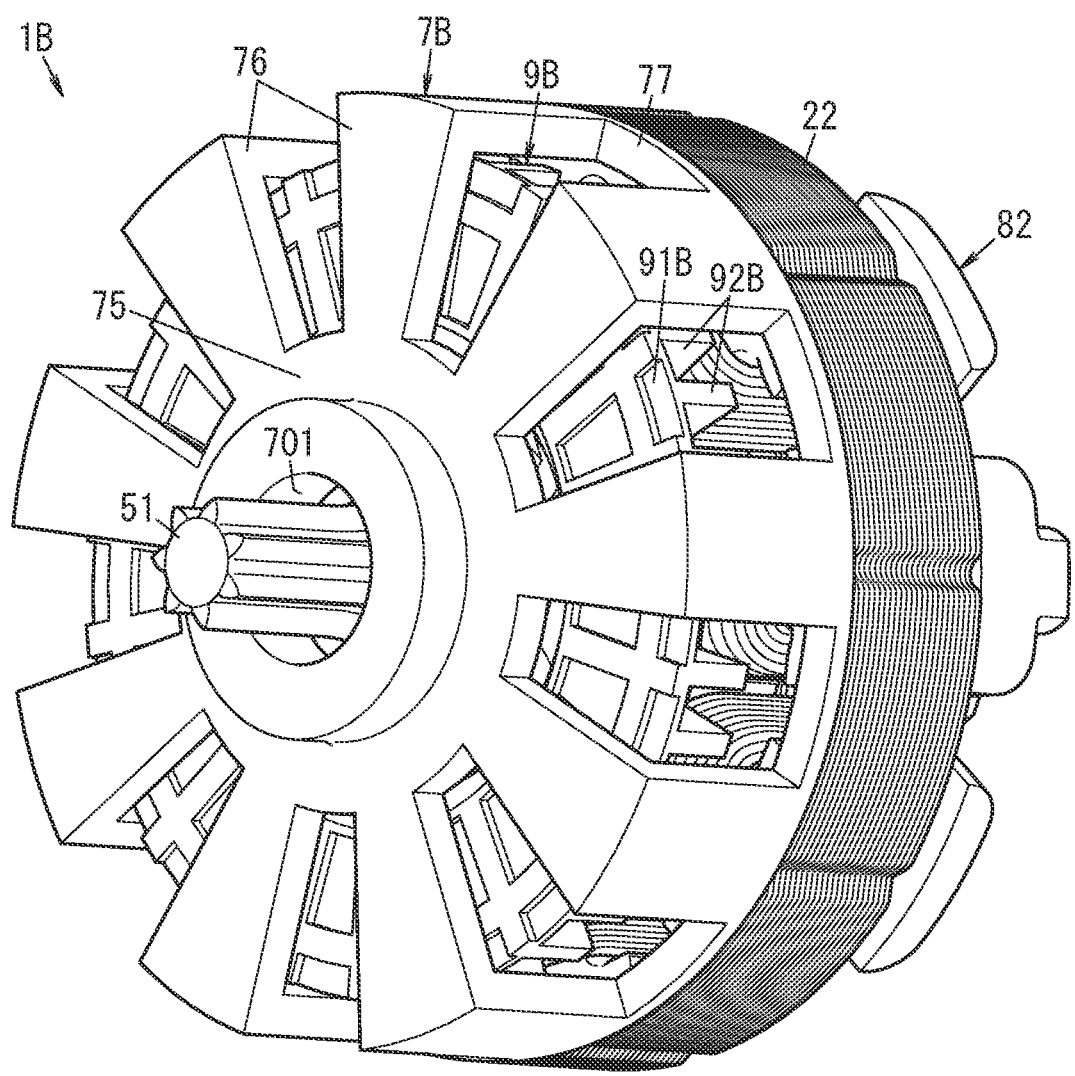
FIG. 13 is a perspective view of a brushless motor according to a fourth variation as viewed obliquely from in front of the brushless motor.
Figure 14:
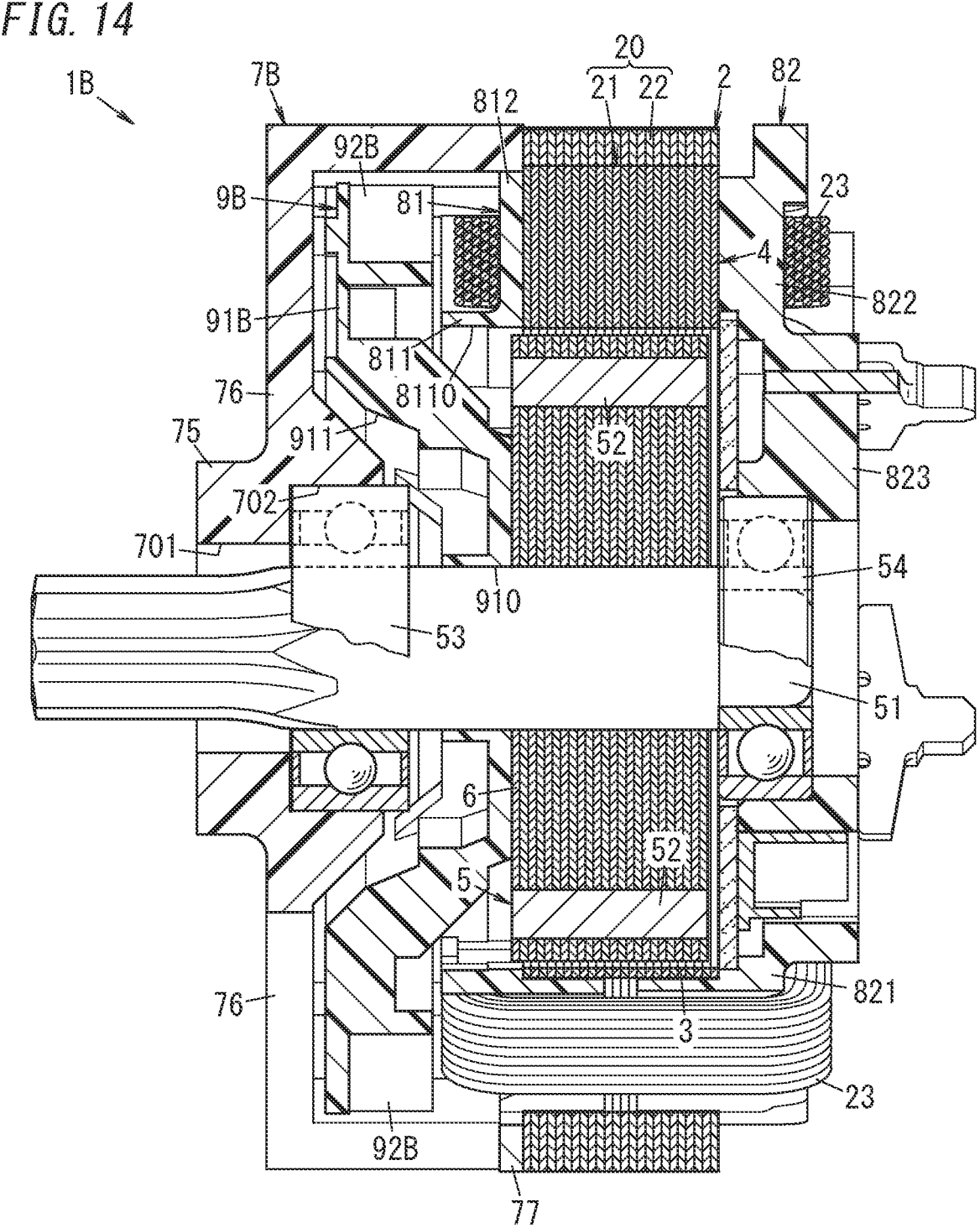
FIG. 14 is a cross-sectional view of the brushless motor.
Figure 15:
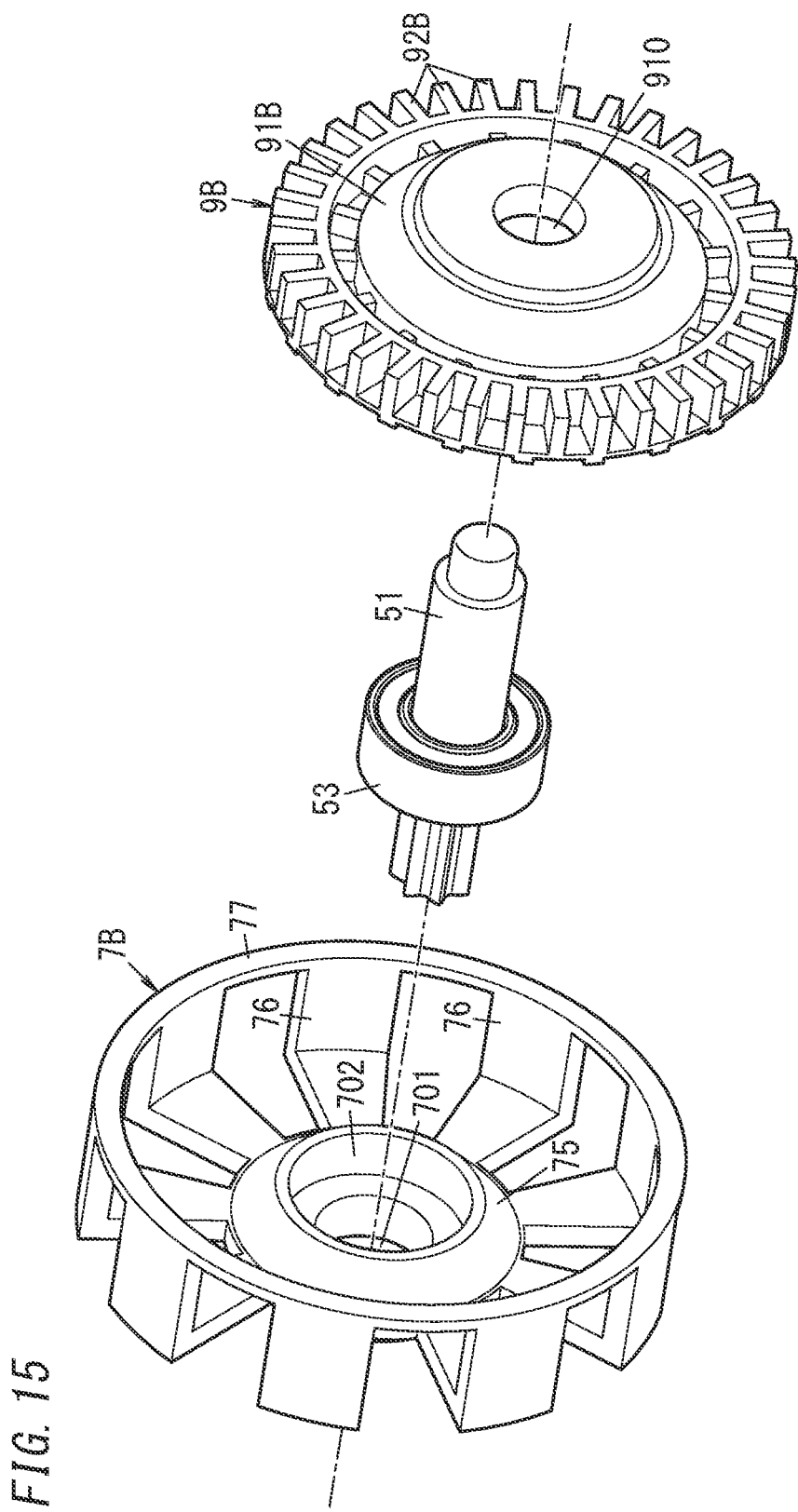
FIG. 15 is an exploded view of main parts of the brushless motor.

Next, a brushless motor 1B according to a fourth variation will be described as a reference example with reference to FIGS. 13-15. In the following description, any constituent element of this fourth variation, having the same function as a counterpart of the embodiment described above, will be designated by the same reference numeral as that counterpart's, and description thereof will be omitted herein.

In this fourth variation, the fan 9B has a different shape from the fan 9 according to the exemplary embodiment described above. In addition, in the brushless motor 1B, the first bearing holder 7B has a different shape from the first bearing holder 7 according to the exemplary embodiment described above.

In addition, in this fourth variation, the rotary shaft 51 also has a different shape from its counterpart of the exemplary embodiment described above. However, the rotary shaft 51 does not have to have the different shape. Furthermore, although the brushless motor 1B according to this fourth variation includes no cap 55 (see FIG. 2), the brushless motor 1B may include the cap 55.

When viewed in the forward/backward direction, the fan 9B has a circular shape. The fan 9B includes a disk portion 91B and a plurality of blades 92B.

The disk portion 91B has a depression 911 on one surface (front surface) thereof. The internal space of the depression 911 has the shape of a truncated cone, of which the opening decreases its area toward its bottom. The disk portion 91B has a shaft hole 910 provided through the bottom surface of the depression 911. The rotary shaft 51 is passed through the shaft hole 910.

The plurality of blades 92B are provided for one surface (rear surface) of the disk portion 91B and located near the outer edge of the disk portion 91B. The longitudinal axis of each of the plurality of blades 92B is aligned with the radius of the disk portion 91B.

The stator 2 includes a first bearing holder 7B. The first bearing holder 7B includes a core portion 75, a plurality of (e.g., nine in FIG. 13) blades 76, and a seat portion 77.

The core portion 75 has a disklike shape. The core portion 75 has a recess 702 on one surface (rear surface) thereof. The first bearing 53 is inserted into the recess 702. That is to say, the first bearing 53 is held by the first bearing holder 7B. The core portion 75 has a shaft hole 701 provided through the bottom surface of the recess 702. The rotary shaft 51 is passed through the shaft hole 701.

The seat portion 77 has an annular shape. The seat portion 77 is disposed behind the core portion 75. The seat portion 77 is attached to the outer cylindrical portion 22 of the stator core 20. The seat portion 77 may be formed integrally with the stator core 20 by insert molding, for example. The first bearing 53 is held by the stator core 20 via the first bearing holder 7B. Alternatively, the seat portion 77 may be held by the coil bobbin 81.

The plurality of blades 76 extend radially from the core portion 75. Each of the plurality of blades 76 has an L-shape. The plurality of blades 76 couples the core portion 75 and the seat portion 77 to each other. The plurality of blades 76 covers the fan 9B. The air produced by the fan 9B passes through the gap between the plurality of blades 76. In addition, the plurality of blades 76 (partially) covers the opening 8110 of the coil bobbin 81, thus reducing the chances of foreign matter entering the space where the rotor core 6 is disposed.

The fan 9B is interposed between the first bearing 53 and the rotor core 6. The first bearing 53 is disposed in the space surrounded with the first bearing holder 7B and the fan 9B.

This fourth variation, as well as the exemplary embodiment described above, also improves the accuracy of the gap left between the rotor 5 and the stator 2, compared to a situation where at least one of the first bearing 53 or the second bearing 54 is held by the electric tool body 108.

Optionally, in the exemplary embodiment and the first to third variations, the fan 9 may also be interposed between the first bearing 53 and the rotor core 6 as in this fourth variation.

Other Variations of Embodiment

Next, other variations of the exemplary embodiment will be enumerated one after another. Optionally, two or more of the variations to be described below may be adopted in combination as appropriate. Alternatively, any of the variations to be described below may also be adopted as appropriate in combination with any of the variations described above.

The first bearing holder 7 and the second bearing holder 823 are preferably held by at least the stator core 20. The first bearing holder 7 and the second bearing holder 823 may or may not be held by the electric tool body 108.

Also, the first bearing 53 may or may not be held by the electric tool body 108 via the first bearing holder 7. The second bearing 54 may or may not be held by the electric tool body 108 via the second bearing holder 823.

The second bearing 54 does not have to be held by the stator 2. Alternatively, the second bearing 54 may also be held by only the electric tool body 108, out of the electric tool body 108 and the stator 2.

The first contact surface 31 of the stator core 20 does not have to be the inner peripheral surface of the inner cylindrical portion 3. Alternatively, the stator core 20 may include a projection which protrudes from the central core 21 along the axis of the rotary shaft 51 (i.e., in the forward/backward direction) and which may have the first contact surface 31. Still alternatively, either the two tip pieces 42 of each of the plurality of teeth 4 or the outer cylindrical portion 22 may have the first contact surface 31.

Although the first bearing holder 7 has the second contact surfaces 720 in contact with the first contact surface 31 in the exemplary embodiment described above, the second bearing holder 823 may also have a second contact surface to contact with the first contact surface 31. Furthermore, the first contact surface 31, with which the second contact surfaces 720 of the first bearing holder 7 are in contact, and the first contact surface, with which the second contact surface of the second bearing holder 823 is in contact, may be mutually different surfaces.

The coil bobbin 81 and the coil bobbin 82 may be formed integrally with each other. More specifically, the coil bobbin 81 and the coil bobbin 82 may be formed as a single member having electrical insulation properties.

The first bearing holder 7 does not have to form part of the stator 2. That is to say, the first bearing holder 7 may be provided separately from the stator core 20, the coil bobbins 81, 82, and other members that form the stator 2.

At least one of the first bearing holder 7 or the second bearing holder 823 may have no electrical insulation properties. At least one of the first bearing holder 7 or the second bearing holder 823 may be made of a metal such as aluminum.

In the exemplary embodiment described above, the first bearing holder 7 is disposed in front of the rotor core 6 and the second bearing holder 823 is disposed behind the rotor core 6. Conversely, the first bearing holder 7 may be disposed behind the rotor core 6 and the second bearing holder 823 may be disposed in front of the rotor core 6.

Each of the first bearing 53 and the second bearing 54 does not have to be a ball bearing but may also be a bush, for example.

The first bearing 53 may be formed integrally with the first bearing holder 7. The second bearing 54 may be formed integrally with the second bearing holder 823.

In the exemplary embodiment described above, the first contact surface 31 and the second contact surfaces 720 are in contact with each other at multiple points. Alternatively, the first bearing holder 7 may also be positioned by bringing the first contact surface 31 and the second contact surfaces 720 into contact with each other in a range with a certain length. The certain length may be, for example, at least one quarter as long as the circumference of the inner peripheral surface of the inner cylindrical portion 3 (i.e., the first contact surface 31).

(Recapitulation)

The embodiment and its variations described above may be specific implementations of the following aspects of the present disclosure.

A brushless motor (1, 1A) according to a first aspect includes a rotor (5), a stator (2), a bearing (first bearing 53), and a bearing holder (first bearing holder 7, 7A). The rotor (5) includes a rotary shaft (51), a rotor core (6), and a plurality of permanent magnets (52). The rotor core (6) holds the rotary shaft (51). The plurality of permanent magnets (52) are held by the rotor core (6). The stator (2) includes a stator core (20) and a plurality of coils (23). The stator core (20) is arranged to surround the rotor (5). The plurality of coils (23) are wound around the stator core (20). The bearing supports the rotary shaft (51) rotatably. The bearing holder holds the bearing. The stator core (20) has a first contact surface (31). A normal vector to the first contact surface (31) is aligned with a radially inward direction defined for the rotary shaft (51). The bearing holder has a second contact surface (720, 712) in contact with the first contact surface (31). A normal vector to the second contact surface (720, 712) is aligned with a radially outward direction defined for the rotary shaft (51). The bearing holder is positioned by bringing the first contact surface (31) into contact with the second contact surface (720, 712).

According to this configuration, the bearing holder (first bearing holder 7, 7A) is positioned by bringing the first contact surface (31) into contact with the second contact surface (720, 712). That is to say, the bearing holder and the bearing (first bearing 53) held by the bearing holder are positioned by the stator core (20). The bearing supports the rotary shaft (51) of the rotor (5). This improves the accuracy of the gap left between the rotor (5) and the stator (2) compared to a situation where the bearing is not positioned by the stator core (20) (e.g., a situation where the bearing is held by only the electric tool body 108).

In a brushless motor (1, 1A) according to a second aspect, which may be implemented in conjunction with the first aspect, the stator core (20) includes: an inner cylindrical portion (3) having a circular cylindrical shape; and a plurality of teeth (4). The plurality of teeth (4) protrude, from the inner cylindrical portion (3), in the radially outward direction defined for the inner cylindrical portion (3). The first contact surface (31) is an inner peripheral surface of the inner cylindrical portion (3).

According to this configuration, the second contact surface (720, 712) is in contact with the inner cylindrical portion (3), thus improving the accuracy of the gap left between the inner cylindrical portion (3) and the rotor core (6), compared to a situation where the second contact surface (720, 712) is in contact with a constituent element other than the inner cylindrical portion (3) (i.e., a constituent element more distant from the rotor core 6).

A brushless motor (1, 1A) according to a third aspect, which may be implemented in conjunction with the first or second aspect, further includes, separately from a first bearing (53) serving as the bearing, a second bearing (54). The second bearing (54) supports the rotary shaft (51) rotatably. The stator (2) includes: a first bearing holder (7, 7A) serving as the bearing holder; and a second bearing holder (823) provided separately from the first bearing holder (7, 7A). The second bearing holder (823) holds the second bearing (54). The rotor core (6) is interposed between the first bearing (53) and the second bearing (54). The first bearing holder (7, 7A) and the second bearing holder (823) are held by the stator core (20).

According to this configuration, the first bearing (53) and second bearing (54) that support the rotary shaft (51) of the rotor (5) are both held by the stator (2). This may reduce the chances of the accuracy of assembling between the electric tool body (108) and the brushless motor (1, 1A) (such as presence or absence of backlash between them), for example, affecting the accuracy of the gap left between the rotor (5) and the stator (2), compared to a situation where at least one of the first bearing (53) or the second bearing (54) is held by the electric tool body (108). That is to say, this improves the accuracy of the gap left between the rotor (5) and the stator (2).

In a brushless motor (1, 1A) according to a fourth aspect, which may be implemented in conjunction with any one of the first to third aspects, the stator (2) includes a coil bobbin (81, 81A). The coil bobbin (81, 81A) has electrical insulation properties and is attached to the stator core (20). The plurality of coils (23) are wound around the stator core (20) via the coil bobbin (81, 81A). The bearing holder (first bearing holder 7, 7A) forms part of the coil bobbin (81, 81A).

This configuration may reduce the number of members that form the brushless motor (1, 1A), compared to a situation where the bearing holder (first bearing holder 7, 7A) is provided separately from the coil bobbin (81, 81A).

In a brushless motor (1, 1A) according to a fifth aspect, which may be implemented in conjunction with any one of the first to third aspects, the stator (2) includes a coil bobbin (81, 81A). The coil bobbin (81, 81A) has electrical insulation properties and is attached to the stator core (20). The plurality of coils (23) are wound around the stator core (20) via the coil bobbin (81, 81A). The bearing holder (first bearing holder 7, 7A) is attached to the coil bobbin (81, 81A).

According to this configuration, the bearing holder (first bearing holder 7, 7A) is attached to the coil bobbin (81, 81A), of which the shape may be designed relatively freely, thus making it easier to provide an attachment structure.

In a brushless motor (1, 1A) according to a sixth aspect, which may be implemented in conjunction with the fifth aspect, the coil bobbin (81, 81A) has an opening (8110) to pass the rotary shaft (51) therethrough. The bearing holder (first bearing holder 7, 7A) has a shaft hole (701) to pass the rotary shaft (51) therethrough. The bearing holder closes the opening (8110).

This configuration may reduce the chances of foreign matter entering the space where the rotor core (6) is disposed.

In a brushless motor (1) according to a seventh aspect, which may be implemented in conjunction with the fifth or sixth aspect, at least one member selected from the bearing holder (first bearing holder 7) and the coil bobbin (81) includes a hook portion (73, 813) to be hooked onto the other member that is either the bearing holder (first bearing holder 7) or the coil bobbin (81). The hook portion (73, 813) of the at least one member is hooked onto the other member by making one or both of the bearing holder and the coil bobbin (81) move along an axis of the rotary shaft (51).

This configuration enables attaching the bearing holder (first bearing holder 7) onto the coil bobbin (81) even without using screws or any other members.

In a brushless motor (1, 1A) according to an eighth aspect, which may be implemented in conjunction with any one of the fifth to seventh aspects, at least one member selected from the bearing holder (first bearing holder 7, 7A) and the coil bobbin (81, 81A) includes a hook portion (73, 74, 813) to be hooked onto the other member that is either the bearing holder (first bearing holder 7, 7A) or the coil bobbin (81, 81A). The hook portion (73, 74, 813) regulates movement of the bearing holder with respect to the coil bobbin (81) along an axis of the rotary shaft (51) to a range in which the second contact surface (720, 712) keeps in contact with the first contact surface (31).

This configuration allows the first contact surface (31) and the second contact surface (720, 712) to be kept in contact with each other.

In a brushless motor (1A) according to a ninth aspect, which may be implemented in conjunction with any one of the fifth to eighth aspects, the bearing holder (first bearing holder 7A) is attached to the coil bobbin (81A) by turning, in either a direction in which the rotary shaft (51) rotates or in an opposite direction thereof, at least one member selected from the bearing holder and the coil bobbin (81A) with respect to the other member that is either the bearing holder or the coil bobbin (81A).

According to this configuration, the bearing holder (first bearing holder 7A) is attached to the coil bobbin (81A) through a procedure involving rotation, thus reducing the chances of the bearing holder coming off the coil bobbin (81A).

A brushless motor (1, 1A) according to a tenth aspect, which may be implemented in conjunction with any one of the first to ninth aspects, includes a fan (9, 9A). The fan (9, 9A) is held by the rotary shaft (51).

This configuration may reduce an increase in the temperature of the rotor (5) and the stator (2).

In a brushless motor (1, 1A) according to an eleventh aspect, which may be implemented in conjunction with the tenth aspect, the fan (9, 9A) is interposed between the bearing (first bearing 53) and the rotor core (6).

This configuration allows the fan (9, 9A) to be disposed in the vicinity of the rotor core (6).

In a brushless motor (1) according to a twelfth aspect, which may be implemented in conjunction with any one of the first to eleventh aspects, the bearing holder (first bearing holder 7) includes a base (71) and a rib (72). The rib (72) protrudes from the base (71) along an axis of the rotary shaft (51). The rib (72) has the second contact surface (720).

This configuration may reduce the chances of causing interference between the rotor core (6) and the bearing holder (first bearing holder 7), compared to a situation where the base (71) has the second contact surface (720) with no ribs (72) provided.

Note that the constituent elements according to the second to twelfth aspects are not essential constituent elements for the brushless motor (1, 1A) but may be omitted as appropriate.

An electric tool (10) according to a thirteenth aspect includes the brushless motor (1, 1A) according to any one of the first to twelfth aspects and an electric tool body (108). The electric tool body (108) houses the brushless motor (1, 1A) therein.

This configuration improves the accuracy of the gap left between the rotor (5) and the stator (2).

REFERENCE SIGNS LIST 1, 1A Brushless Motor
2 Stator
20 Stator Core
23 Coil
3 Inner Cylindrical Portion
4 Tooth
31 First Contact Surface
5 Rotor
51 Rotary Shaft
52 Permanent Magnet
53 First Bearing (Bearing)
54 Second Bearing
6 Rotor Core
7, 7A First Bearing Holder (Bearing Holder)
701 Shaft Hole
71 Base
72 Rib
720, 712 Second Contact Surface
73, 74, 813 Hook Portion
81, 81A Coil Bobbin
8110 Opening
823 Second Bearing Holder
9, 9A Fan
10 Electric Tool
108 Electric Tool Body

The invention claimed is:

1. A brushless motor comprising:
a rotor including: a rotary shaft; a rotor core holding the rotary shaft; and a plurality of permanent magnets held by the rotor core;
a stator including: a stator core arranged to surround the rotor; and a plurality of coils wound around the stator core;
a bearing supporting the rotary shaft rotatably; and
a bearing holder holding the bearing,
the stator core having a first contact surface, a normal vector to the first contact surface being aligned with a radially inward direction defined for the rotary shaft,
the bearing holder having a second contact surface in contact with the first contact surface, a normal vector to the second contact surface being aligned with a radially outward direction defined for the rotary shaft,
the bearing holder being positioned by bringing the first contact surface into contact with the second contact surface.

2. The brushless motor of claim 1, wherein
the stator core includes: an inner cylindrical portion having a circular cylindrical shape; and a plurality of teeth, each protruding, from the inner cylindrical portion, in the radially outward direction defined for the inner cylindrical portion, and
the first contact surface is an inner peripheral surface of the inner cylindrical portion.

3. The brushless motor of claim 1, further comprising, separately from a first bearing serving as the bearing, a second bearing holding the rotary shaft rotatably, wherein
the stator includes:
a first bearing holder serving as the bearing holder; and
a second bearing holder holding the second bearing, the second bearing holder being provided separately from the first bearing holder,
the rotor core is interposed between the first bearing and the second bearing, and
the first bearing holder and the second bearing holder are held by the stator core.

4. The brushless motor of claim 1, wherein
the stator includes a coil bobbin, the coil bobbin having electrical insulation properties and attached to the stator core,
the plurality of coils are wound around the stator core via the coil bobbin, and
the bearing holder forms part of the coil bobbin.

5. The brushless motor of claim 1, wherein
the stator includes a coil bobbin, the coil bobbin having electrical insulation properties and attached to the stator core,
the plurality of coils are wound around the stator core via the coil bobbin, and
the bearing holder is attached to the coil bobbin.

6. The brushless motor of claim 5, wherein
the coil bobbin has an opening to pass the rotary shaft therethrough, and
the bearing holder has a shaft hole to pass the rotary shaft therethrough and closes the opening.

7. The brushless motor of claim 5, wherein
at least one member selected from the bearing holder and the coil bobbin includes a hook portion to be hooked onto the other member that is either the bearing holder or the coil bobbin, and
the hook portion of the at least one member is hooked onto the other member by making one or both of the bearing holder and the coil bobbin move along an axis of the rotary shaft.

8. The brushless motor of claim 5, wherein
at least one member selected from the bearing holder and the coil bobbin includes a hook portion to be hooked onto the other member that is either the bearing holder or the coil bobbin, and
the hook portion is configured to regulate movement of the bearing holder with respect to the coil bobbin along an axis of the rotary shaft to a range in which the second contact surface keeps in contact with the first contact surface.

9. The brushless motor of claim 5, wherein
the bearing holder is to be attached to the coil bobbin by turning, in either a direction in which the rotary shaft rotates or in an opposite direction thereof, at least one member selected from the bearing holder and the coil bobbin with respect to the other member that is either the bearing holder or the coil bobbin.

10. The brushless motor of claim 1, comprising a fan held by the rotary shaft.

11. The brushless motor of claim 10, wherein
the fan is interposed between the bearing and the rotor core.

12. The brushless motor of claim 1, wherein
the bearing holder includes:
a base; and
a rib protruding from the base along an axis of the rotary shaft and having the second contact surface.

13. An electric tool comprising:
the brushless motor of claim 1; and
an electric tool body housing the brushless motor therein.

* * * * *